US012394186B2

(12) United States Patent
Ma et al.

(10) Patent No.: US 12,394,186 B2
(45) Date of Patent: Aug. 19, 2025

(54) SYSTEMS, METHODS, AND APPARATUSES FOR IMPLEMENTING SELF-SUPERVISED DOMAIN-ADAPTIVE PRE-TRAINING VIA A TRANSFORMER FOR USE WITH MEDICAL IMAGE CLASSIFICATION

(71) Applicant: Arizona Board of Regents on behalf of Arizona State University, Scottsdale, AZ (US)

(72) Inventors: DongAo Ma, Tempe, AZ (US); Jiaxuan Pang, Tempe, AZ (US); Nahid Ul Islam, Mesa, AZ (US); Mohammad Reza Hosseinzadeh Taher, Tempe, AZ (US); Fatemeh Haghighi, Tempe, AZ (US); Jianming Liang, Scottsdale, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 347 days.

(21) Appl. No.: 18/126,318

(22) Filed: Mar. 24, 2023

(65) Prior Publication Data
US 2023/0306723 A1 Sep. 28, 2023

Related U.S. Application Data

(60) Provisional application No. 63/405,262, filed on Sep. 9, 2022, provisional application No. 63/323,988, filed on Mar. 25, 2022.

(51) Int. Cl.
G06V 10/774 (2022.01)
G06N 3/0895 (2023.01)
(Continued)

(52) U.S. Cl.
CPC ........ *G06V 10/774* (2022.01); *G06N 3/0895* (2023.01); *G06T 7/0012* (2013.01);
(Continued)

(58) Field of Classification Search
CPC .. G06V 10/774; G06V 10/764; G06V 10/776; G06V 2201/03; G06V 10/82;
(Continued)

(56) References Cited

U.S. PATENT DOCUMENTS 5,577,188 A 11/1996 Zhu
10,650,286 B2 * 5/2020 Ben-Ari ................... G06N 3/08
(Continued)

OTHER PUBLICATIONS

Azizi, S. et al., "Big self-supervised models advance medical image classification," Proceedings of the IEEE/CVF International Conference on Computer Vision, 2021, pp. 3478-3488.
(Continued)

*Primary Examiner* — Michael S Osinski
(74) *Attorney, Agent, or Firm* — Elliott, Ostrander & Preston, P.C.

(57) ABSTRACT

Described herein are systems, methods, and apparatuses for implementing self-supervised domain-adaptive pre-training via a transformer for use with medical image classification in the context of medical image analysis. An exemplary system includes means for receiving a first set of training data having non-medical photographic images; receiving a second set of training data with medical images; pre-training an AI model on the first set of training data with the non-medical photographic images; performing domain-adaptive pre-training of the AI model via self-supervised learning operations using the second set of training data having the medical images; generating a trained domain-adapted AI model by fine-tuning the AI model against the targeted medical diagnosis task using the second set of training data having the medical images; outputting the
(Continued)

trained domain-adapted AI model; and executing the trained domain-adapted AI model to generate a predicted medical diagnosis from an input image not present within the training data.

20 Claims, 18 Drawing Sheets

(51) Int. Cl.
  *G06T 7/00* (2017.01)
  *G06V 10/764* (2022.01)
  *G06V 10/776* (2022.01)

(52) U.S. Cl.
  CPC .......... *G06V 10/764* (2022.01); *G06V 10/776* (2022.01); *G06T 2207/10116* (2013.01); *G06T 2207/20081* (2013.01); *G06T 2207/20092* (2013.01); *G06T 2207/30004* (2013.01); *G06V 2201/03* (2022.01)

(58) Field of Classification Search
  CPC .... G06V 10/454; G06V 10/25; G06N 3/0895; G06N 3/0464; G06N 3/096; G06N 3/045; G06N 3/08; G06N 3/084; G06N 3/088; G06N 3/047; G06T 7/0012; G06T 2207/10116; G06T 2207/20081; G06T 2207/20092; G06T 2207/30004; G06T 2207/20084; G06T 7/11; G06T 2207/10081; G06T 2207/10088; G06T 2207/10072; G06T 2207/30196; G16H 30/40; G16H 50/20; G16H 50/70
  See application file for complete search history.

(56) References Cited

U.S. PATENT DOCUMENTS

| | | | |
|---|---|---|---|
| 11,100,647 B2 * | 8/2021 | Nikolov | A61N 5/1039 |
| 11,334,992 B2 * | 5/2022 | Schmidt-Richberg | G06F 18/22 |
| 12,051,428 B1 * | 7/2024 | Petrochuk | G10L 25/30 |
| 2016/0093048 A1 * | 3/2016 | Cheng | G06V 10/82 382/131 |
| 2016/0224892 A1 * | 8/2016 | Sawada | G06N 3/08 |
| 2018/0225823 A1 * | 8/2018 | Zhou | G06T 7/11 |
| 2018/0240219 A1 * | 8/2018 | Mentl | G06N 3/08 |
| 2019/0073569 A1 * | 3/2019 | Ben-Ari | G16H 50/70 |
| 2019/0205766 A1 * | 7/2019 | Krebs | G06F 18/2413 |
| 2020/0082534 A1 * | 3/2020 | Nikolov | A61B 6/501 |
| 2020/0130177 A1 * | 4/2020 | Kolouri | G06N 3/084 |
| 2021/0004646 A1 * | 1/2021 | Guizilini | G06F 18/2148 |
| 2021/0056693 A1 * | 2/2021 | Cheng | G06N 3/045 |
| 2021/0118184 A1 * | 4/2021 | Pillai | G06N 3/088 |
| 2021/0150710 A1 | 5/2021 | Hosseinzadeh Taher et al. | |
| 2021/0158580 A1 * | 5/2021 | Barroyer | G06N 3/08 |
| 2021/0248427 A1 * | 8/2021 | Guo | G06V 10/82 |
| 2022/0012891 A1 * | 1/2022 | Nikolov | A61B 5/7267 |
| 2022/0114389 A1 * | 4/2022 | Ghose | G06V 10/25 |
| 2022/0148191 A1 * | 5/2022 | Liu | G06T 7/162 |
| 2022/0164610 A1 * | 5/2022 | Otto | G06V 10/764 |
| 2022/0198339 A1 * | 6/2022 | Zhao | G06N 3/08 |
| 2022/0254150 A1 * | 8/2022 | Wolfe | G06V 10/776 |
| 2022/0262105 A1 * | 8/2022 | Zhou | G06V 10/82 |
| 2023/0129779 A1 * | 4/2023 | Sommer | G06V 10/273 382/157 |
| 2023/0146292 A1 * | 5/2023 | Zhou | G06N 3/045 706/26 |
| 2023/0154164 A1 * | 5/2023 | Ghesu | G16H 50/70 382/128 |
| 2023/0237333 A1 * | 7/2023 | Shao | G06V 10/762 706/25 |
| 2023/0274420 A1 * | 8/2023 | Seah | G06F 40/30 382/128 |
| 2023/0281828 A1 * | 9/2023 | Du | G06V 10/774 382/157 |
| 2024/0029868 A1 * | 1/2024 | Gulsun | G16H 50/20 |
| 2024/0046453 A1 * | 2/2024 | Jacob | G16H 50/20 |
| 2024/0102979 A1 * | 3/2024 | Tai | G01N 33/0034 |
| 2024/0203098 A1 * | 6/2024 | Sultana | G06V 10/776 |
| 2024/0211825 A1 * | 6/2024 | Wu | G06N 3/04 |

OTHER PUBLICATIONS

Bao, H. et al., "BEiT: BERT Pre-Training of Image Transformers," Proceedings of the IEEE/CVF International Conference on Computer Vision, arXiv preprint arXiv:2106.08254 (2021), 18 pages.

Bustos, A., et al., "Padchest: A large chest x-ray image dataset with multi-label annotated reports," Medical Image Analysis vol. 66, 101797 (2020).

Candemir, S., et al., "Lung Segmentation in Chest Radiographs Using Anatomical Atlases with Nonrigid Registration," IEEE Transactions on Medical Imaging, vol. 33(2), pp. 577-590 (2013).

Cao, H., et al., "Swin-Unet: Unet-like Pure Transformer for Medical Image Segmentation," arXiv preprint arXiv:2105.05537 (2021).

Caron, M. et al., "Emerging Properties in Self-Supervised Vision Transformers," Proceedings of the IEEE/CVF International Conference on Computer Vision, pp. 9650-9660 (2021).

Chen, L., et al., "Identifying cardiomegaly in chest x-rays using dual attention network," Applied Intelligence, vol. 52, pp. 11058-11067 (2022).

Chen, X. et al., "An Empirical Study of Training Self-supervised Vision Transformers," Proceedings of the IEEE/CVF International Conference on Computer Vision, 2021, pp. 9640-9649.

Chen, Z., et al., "Masked Image Modeling Advances 3d Medical Image Analysis," Proceedings of the IEEE/CVF Winter Conference on Applications of Computer Vision (WACV), pp. 1970-1980 (2023).

Chowdhury, M.E., et al., "Can AI Help in Screening Viral and COVID-19 Pneumonia?", IEEE Access vol. 8, pp. 132665-132676 (2020).

Colak, E. et al., "The RSNA Pulmonary Embolism CT Dataset," Radiology: Artificial Intelligence, vol. 3, No. 2, 2021, 7 pages.

Dosovitskiy, A. et al., "An Image is Worth 16x16 Words: Transformers for Image Recognition at Scale," arXiv preprint arXiv:2010.11929v2 [cs.CV] Jun. 3, 2021, 22 pages.

Haghighi, F. et al., "DiRA: Discriminative, Restorative, and Adversarial Learning for Self-Supervised Medical Image Analysis," In Proceedings of the IEEE/CVF Conference on Computer Vision and Pattern Recognition (CVPR), 2022, pp. 20824-20834.

Haghighi, F. et al., "Learning Semantics-enriched Representation via Self- discovery, Self-classification, and Self-restoration," Medical Image Computing and Computer Assisted Intervention— MICCAI 2020, Lecture Notes in Computer Science, vol. 12261, Springer International Publishing Cham (2020), pp. 137-147.

Haghighi, F. et al., "Transferable Visual Words: Exploiting the Semantics of Anatomical Patterns for Self-supervised Learning," IEEE Transactions on Medical Imaging, vol. 40, No. 10, 2021, pp. 2857-2868.

Han, K., et al., "A Survey on Vision Transformer," IEEE Transactions on Pattern Analysis and Machine Intelligence, vol. 45, No. 1, pp. 87-110 (2022).

Hatamizadeh, A., et al., "Swin UNETR: Swin Transformers for Semantic Segmentation of Brain Tumors in MRI Images," arXiv preprint arXiv:2201.01266v1 [eess.IV] (2022), 13 pages.

Haztamizadeh, A., et al., "UNETR: Transformers for 3D Medical Image Segmentation," Proceedings of the IEEE/CVF Winter Conference on Applications of Computer Vision (WACV) (2022), pp. 574-584.

He, K. et al., "Deep Residual Learning for Image Recognition", Proceedings of the IEEE Conference on Computer Vision and Pattern Recognition (CVPR), Jun. 2016, pp. 770-778.

He, K. et al., "Masked Autoencoders are Scalable Vision Learners," Proceedings of the IEEE/CVF Conference on Computer Vision and Pattern Recognition (CVPR), (2022), pp. 16000-16009.

(56) References Cited

OTHER PUBLICATIONS

Irvin, J. et al. "CheXpert: A Large Chest Radiograph Dataset with Uncertainty Labels and Expert Comparison," Proceedings of the AAAI Conference on Artificial Intelligence, vol. 33, No. 01, 2019, pp. 590-597.

Jaeger, S. et al., "Two public chest X-ray datasets for computer-aided screening of pulmonary diseases," Quantitative Imaging in Medicine and Surgery, vol. 4, No. 6, 2014, pp. 475-477.

Johnson, A.E., et al., "MIMIC-CXR, a de-identified publicly available database of chest radiographs with free-text reports," Scientific Data vol. 6, Article No. 317, (2019), pp. 1-8.

Khan, S., et al., "Transformers in Vision: A Survey," ACM Computing Surveys (CSUR), vol. 54, Issue 10, Article 200, (2022), pp. 200:1-200:41.

Kim, E., et al., "XProtoNet: Diagnosis in Chest Radiography with Global and Local Explanations," IEEE/CVF Conference on Computer Vision and Pattern Recognition (CVPR), (2021), pp. 15719-15728.

Li, Y., "Benchmarking Detection Transfer Learning with Vision Transformers," arXiv preprint arXiv:2111.11429v1 [cs.CV] (2021), 9 pages.

Liu, Z. et al., "Swin Transformer: Hierarchical Vision Transformer Using Shifted Windows," Proceedings of the IEEE/CVF International Conference on Computer Vision (ICCV), 2021, pp. 10012-10022.

Ma, D., et al., "Benchmarking Transformers for Medical Image Classification," 2022, 14 pages.

Matsoukas, C., et al., "Is it Time to Replace CNNs with Transformers for Medical Images?", arXiv preprint arXiv:2108.09038v1 [cs.CV] (2021), 6 pages.

Nguyen, H.Q., et al., "VinDR-CXR: An open dataset of chest X-rays with radiologist's annotations," Scientific Data, vol. 9, Article 429 (2022), 7 pages.

Parvaiz, A., et al., "Vision Transformers in medical computer vision—A contemplative retrospection," in Engineering Applications of Artificial Intelligence, vol. 122, 2023, 38 pages.

Paszke, A., et al., "PyTorch: An Imperative Style, High-Performance Deep Learning Library," Advances in Neural Information Processing Systems vol. 32 (NeurIPS 2019), pp. 8024-8035.

Ridnik, T., et al., "Imagenet-21k Pretraining for the Masses," arXiv preprint arXiv:210410972v4 [cs.CV] (2021), 20 pages.

Russakovsky, O., et al., "ImageNet Large Scale Visual Recognition Challenge," International Journal of Computer Vision, vol. 115, 2015, 211-252.

Shamshad, F., et al., "Transformers in medical imaging: A survey," in Medical Image Analysis, vol. 88, 2023, 102802, 40 pages.

Shiraishi, J., et al., "Development of a Digital Image Database for Chest Radiographs With and Without a Lung Nodule: Receiver Operating Characteristic Analysis of Radiologists' Detection of Pulmonary Nodules," American Journal of Roentgenology, vol. 174, Issue 1, (2000), pp. 71-74.

Steiner, A., et al., "How to train your ViT? Data, Augmentation, and Regularization in Vision Transformers," arXiv preprint arXiv:2106:10270v2 [cs.CV] (2022), 16 pages.

Sun, C. et al., "Revisiting Unreasonable Effectiveness of Data in Deep Learning Era," Proceedings of the IEEE International Conference on Computer Vision (ICCV), 2017, pp. 843-852.

Taher, M.R.H., et al., "CAiD: Context-Aware Instance Discrimination for Self-supervised Learning in Medical Imaging," International Conference on Medical Imaging with Deep Learning (PMLR), vol. 172 (2022), pp. 535-551.

Taher, M.R.H., et al., "A Systematic Benchmarking Analysis of Transfer Learning for Medical Image Analysis," Domain Adaptation and Representation Transfer, and Affordable Healthcare and AI for Resource Diverse Global Health: Dart Fair 2021, Lecture Notes in Computer Science, vol. 12968, Springer International Publishing Cham (2021), pp. 3-13.

Touvron, H., "Training data-efficient image transformers & distillation through attention," Proceedings of the 38th International Conference on Machine Learning, PMLR, vol. 139, 2021, pp. 10347-10357.

Wang, H., et al., "Triple attention learning for classification of 14 thoracic diseases using chest radiography," Medical Image Analysis, vol. 67, 101846 (2021), 13 pages.

Wang, L., et al., "COVID-Net: a tailored deep convolutional neural network design for detection of COVID-19 cases from chest X-ray images," Scientific Reports, vol. 10, Article No. 19549, (2020), 12 pages.

Wang, X., et al., "ChestX-ray8: Hospital-scale Chest X-ray Database and Benchmarks on Weakly-Supervised Classification and Localization of Common Thorax Diseases," Proceedings of the IEEE Conference on Computer Vision and Pattern Recognition (CVPR), (2017), pp. 2097-2106.

Xie, Z. et al., "Self-Supervised Learning with Swin Transformers," arXiv reprint arXiv:2015.04553v2 [cs.CV] (2021), 8 pages.

Xie, Z. et al., "SimMIM: A Simple Framework for Masked Image Modeling," Proceedings of the IEEE/CVF Conference on Computer Vision and Pattern Recognition (CVPR), 2022, pp. 9653-9663.

Zhai, X., et al., "Scaling Vision Transformers," Proceedings of the IEEE/CVF Conference on Computer Vision and Pattern Recognition, (2021), pp. 12104-12113.

Zhou, Z., et al., "Models Genesis," Medical Image Analysis, vol. 67, 101840 (2021).

* cited by examiner

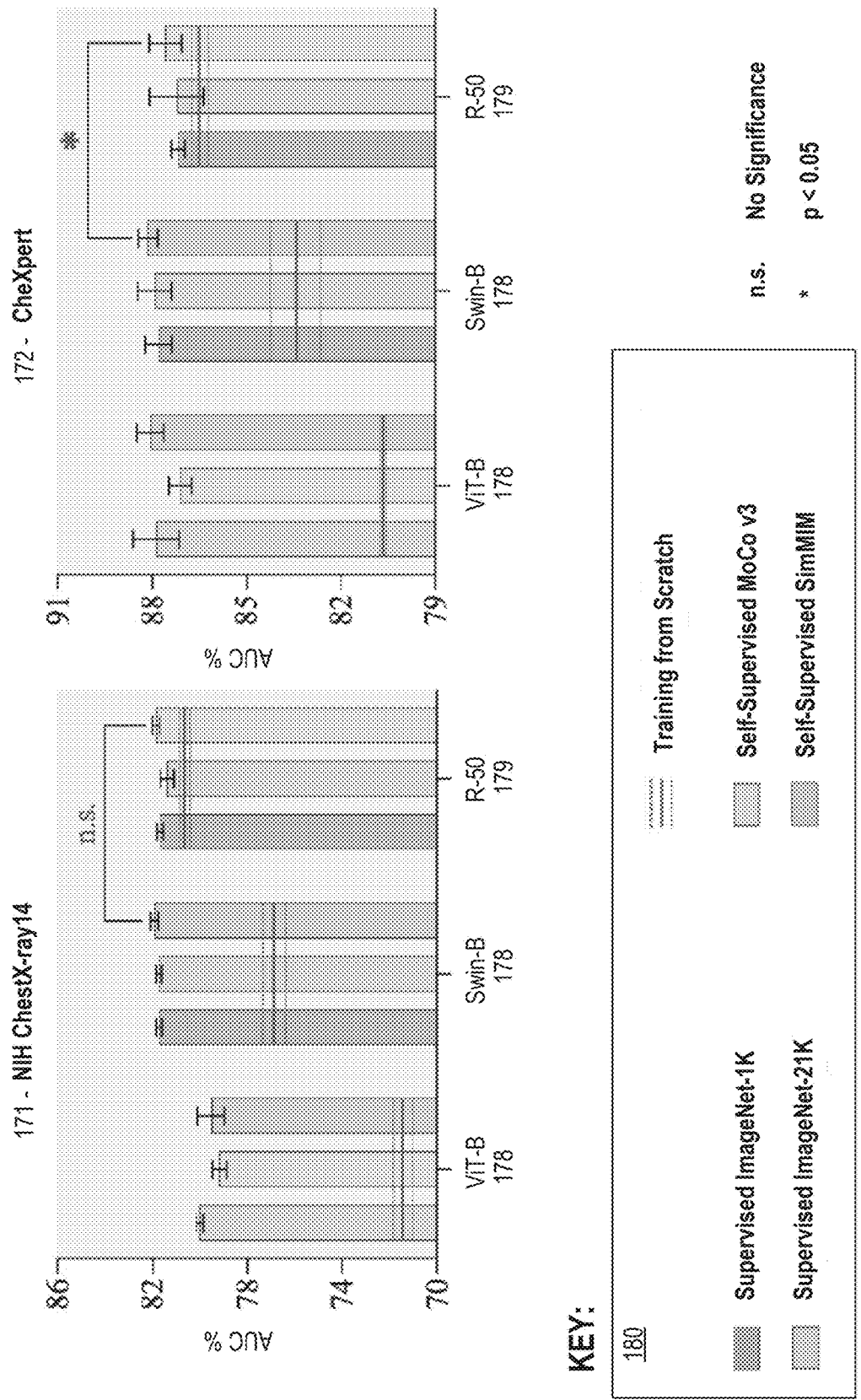

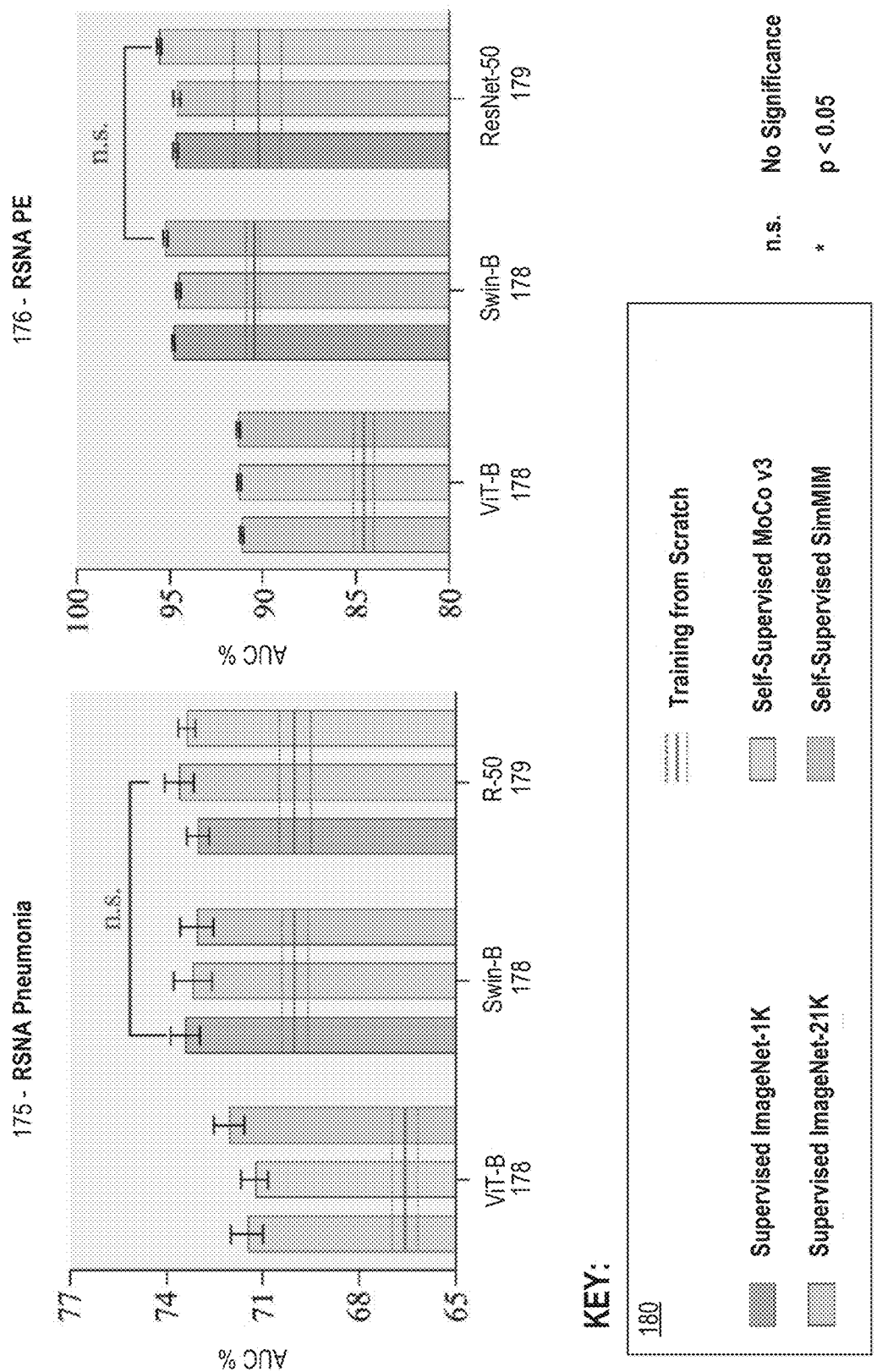

TABLE 1:

| Initialization | Backbone | ChestX-ray14 | CheXpert | Shenzhen | VinDr-CXR | RSNA Pneumonia | RSNA PE |
|---|---|---|---|---|---|---|---|
| Scratch | ViT-B | 71.60±0.33 | 80.78±0.63 | 82.24±0.60 | 70.22±1.95 | 66.59±0.39 | 84.68±0.09 |
| | Swin-B | 77.04±0.34 | 83.39±0.84 | 92.52±4.98 | 78.49±1.00 | 70.02±0.42 | 90.63±0.10 |
| Supervised | ViT-B | 80.05±0.17 | 87.88±0.50 | 93.67±1.03 | 88.30±1.45 | 71.50±0.52 | 91.10±0.11 |
| | Swin-B | 81.73±0.14 | 87.80±0.42 | 93.35±0.77 | 90.35±0.31 | 73.44±0.46 | 94.85±0.07 |
| SimMIM | ViT-B | 79.55±0.56 | 88.07±0.43 | 93.47±2.48 | 88.91±0.35 | 72.08±0.47 | 91.39±0.10 |
| | Swin-B | 81.95±0.15 | 88.10±0.31 | 94.12±0.96 | 90.24±0.35 | 73.66±0.34 | 95.27±0.12 |

TABLE 2:

| Initialization | ChestX-ray14 | CheXpert | Shenzhen | VinDr-CXR | RSNA Pneumonia |
|---|---|---|---|---|---|
| Scratch | 77.04±0.34 | 83.39±0.84 | 83.92±1.19 | 78.49±1.00 | 70.02±0.42 |
| ImageNet | 81.95±0.15 | 88.16±0.31 | 93.63±1.80 | 90.24±0.35 | 73.66±0.34 |
| ChestX-ray14 | 78.87±0.69 | 86.75±0.96 | 93.03±0.48 | 79.86±1.82 | 71.99±0.55 |
| X-rays (926K) | 82.72±0.17 | 87.83±0.23 | 95.21±1.44 | 90.60±1.95 | 73.73±0.50 |
| ImageNet → ChestX-ray14 | 82.45±0.15 | 87.74±0.31 | 94.83±0.90 | 90.33±0.88 | 73.87±0.48 |
| ImageNet → X-rays (926K) | 83.04±0.15 | 88.37±0.40 | 95.76±1.79 | 91.71±1.04 | 74.09±0.39 |

TABLE 3:

| Backbone | Initialization | ChestX-ray14 | CheXpert | Shenzhen | VinDr-CXR | RSNA Pneumonia | RSNA PE |
|---|---|---|---|---|---|---|---|
| ResNet-50 | Scratch | 80.40±0.05 | 86.62±0.15 | 89.03±1.82 | 87.39±0.42 | 70.00±0.50 | 90.37±1.32 |
| | Supervised | 81.70±0.15 | 87.17±0.22 | 95.62±0.63 | 91.77±0.40 | 73.04±0.35 | 94.73±0.12 |
| | Sup. (IN21K) | 81.40±0.27 | 87.23±0.86 | 94.64±0.39 | 91.66±0.56 | 73.63±0.45 | 94.66±0.18 |
| | DINO | 81.41±0.35 | 87.37±0.45 | 96.38±0.48 | 90.96±0.68 | 73.58±0.35 | 95.60±0.10 |
| | MoCo-V3 | 81.87±0.15 | 87.59±0.51 | 95.55±0.40 | 91.91±0.59 | 73.39±0.27 | 95.01±0.12 |
| ViT-B | Scratch | 71.69±0.32 | 80.78±0.03 | 82.24±0.60 | 70.22±1.95 | 66.59±0.39 | 84.68±0.09 |
| | Sup. (IN21K) | 80.05±0.17 | 87.88±0.50 | 93.67±1.03 | 88.30±1.45 | 71.50±0.62 | 91.19±0.11 |
| | DeiT | 70.46±0.24 | 87.49±0.43 | 95.35±0.80 | 89.64±2.97 | 72.93±0.62 | 91.95±0.07 |
| | DINO | 78.37±0.47 | 87.01±0.63 | 90.39±4.29 | 82.89±1.10 | 71.27±0.45 | 88.99±0.08 |
| | MoCo-V3 | 79.20±0.30 | 87.12±0.36 | 92.85±1.00 | 87.25±0.63 | 72.79±0.52 | 91.33±0.10 |
| | BEiT (IN21K) | 79.01±0.24 | 87.77±0.38 | 92.87±1.08 | 85.93±1.98 | 72.78±0.37 | 91.31±0.10 |
| | MAE | 79.01±0.58 | 87.12±0.54 | 92.52±4.98 | 87.00±1.74 | 72.85±0.50 | 91.96±0.12 |
| | SimMIM | 79.55±0.56 | 88.07±0.43 | 93.47±2.48 | 88.91±0.55 | 72.08±0.47 | 91.39±0.10 |
| Swin-B | Scratch | 77.04±0.34 | 83.39±0.84 | 92.52±4.95 | 78.49±1.00 | 70.02±0.42 | 90.63±0.10 |
| | Supervised | 81.73±0.14 | 87.80±0.42 | 93.35±0.77 | 90.35±0.31 | 73.44±0.46 | 94.85±0.07 |
| | Sup. (IN21K) | 81.74±0.13 | 87.94±0.54 | 94.21±1.25 | 91.23±1.06 | 73.20±0.59 | 94.58±0.13 |
| | SimMIM | 81.95±0.15 | 88.16±0.31 | 94.12±0.96 | 90.24±0.35 | 73.66±0.34 | 95.27±0.12 |

TABLE 4:

| Source Datasets | Number of Images |
|---|---|
| NIH ChestX-ray14 | 86,524 |
| CheXpert | 223,414 |
| VinDR-CXR | 15,000 |
| NIH Shenzhen CXR | 662 |
| RSNA Pneumonia Detection Challenge | 26,684 |
| MIMIC-CXR database v2.0.0 | 377,028 |
| PadChest | 160,828 |
| COVID-19 Radiography Database | 21,165 |
| Indiana ChestX-ray | 7,883 |
| Mendeley-V2 | 5,232 |
| COVIDx | 1,223 |
| JSRT | 243 |
| Montgomery County X-ray Set | 138 |
| X-ray (926K) | 926,028 |

TABLE 5:

| Method | Backbone | Mean | Atel | Card | Effu | Infi | Mass | Nodu | Pne1 | Pne2 | Cons | Edem | Emph | Fibr | P.T. | Hern |
|---|---|---|---|---|---|---|---|---|---|---|---|---|---|---|---|---|
| CXRDANet | DN-121 | 81.9 | 76.0 | 89.8 | 82.7 | 71.0 | 83.2 | 78.3 | 73.6 | 87.6 | 75.1 | 86.4 | 89.0 | 83.6 | 78.9 | 94.0 |
| A³Net | DN-121 | 82.6 | 77.9 | 89.5 | 83.6 | 71.0 | 83.4 | 77.7 | 73.7 | 87.8 | 75.9 | 85.5 | 93.3 | 83.9 | 79.1 | 93.8 |
| XProtoNet | DN-121 | 82.2 | 78.0 | 88.7 | 83.5 | 71.0 | 83.1 | 80.4 | 73.4 | 87.1 | 74.7 | 84.0 | 94.1 | 81.5 | 79.9 | 90.8 |
| TransVW | DN-121 | 82.5 | 78.7 | 89.1 | 84.1 | 69.9 | 83.1 | 79.3 | 73.1 | 87.8 | 75.4 | 85.0 | 93.5 | 84.4 | 80.3 | 92.2 |
| Disclosed Method | Swin-B | 83.2 | 79.3 | 90.7 | 84.6 | 71.5 | 85.3 | 76.6 | 74.5 | 88.5 | 76.8 | 86.3 | 92.9 | 84.2 | 80.4 | 93.5 |

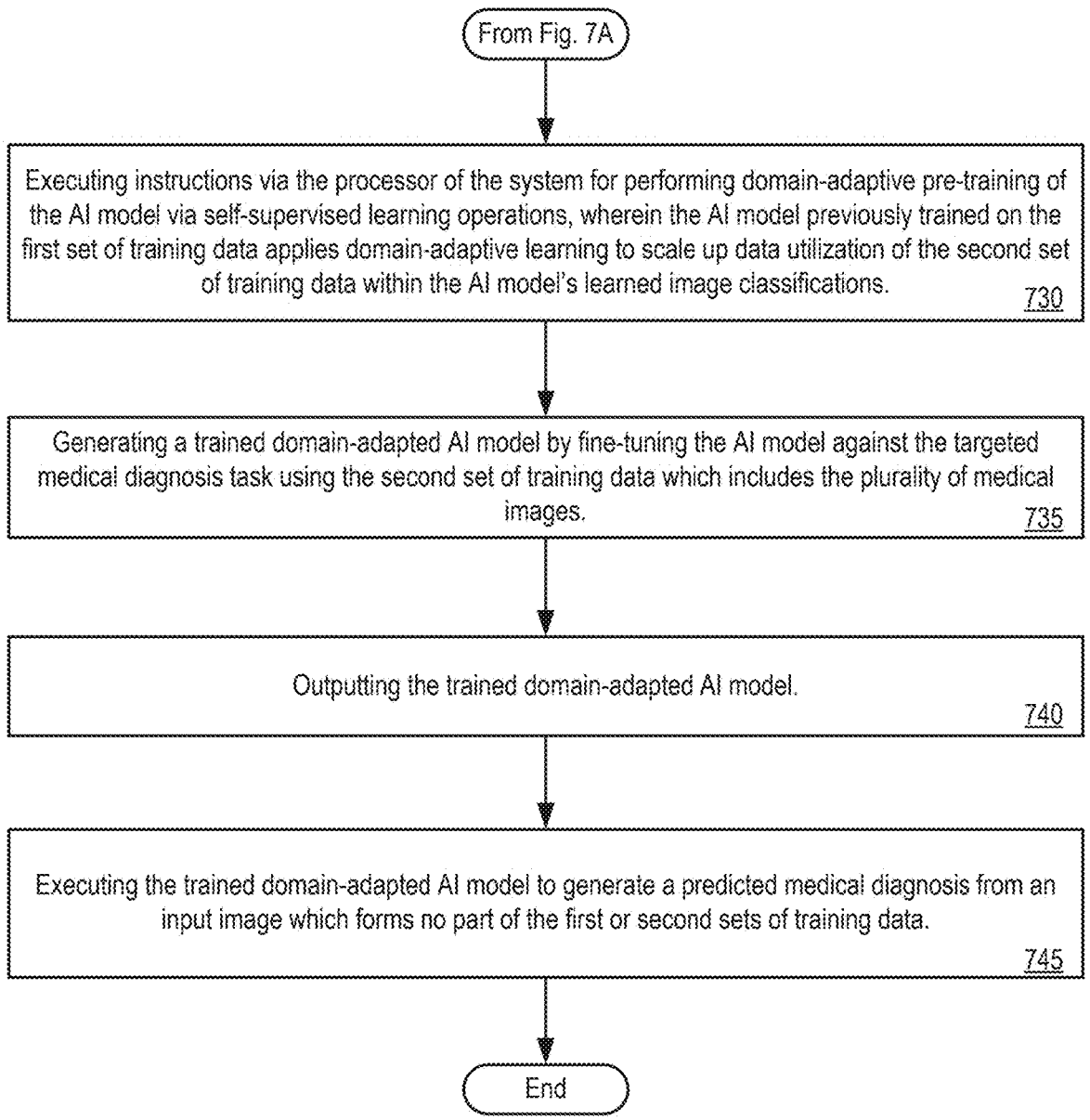

Table 6 - 801

| Initialization | ViT Small | ViT Base | Swin Base | ResNet50 |
|---|---|---|---|---|
| Scratch | 71.24±0.69 | 71.69±0.32 | 76.86±0.17 | 80.40±0.05 |
| ImageNet | 79.26±0.15 | 79.09±0.21 | 81.67±0.19 | 81.70±0.15 |
| MoCo v3 | 79.36±0.33 | 79.20±0.30 | — | — |
| BEiT | — | 78.14±1.87 | — | — |
| DINO | 74.46±0.39 | 78.37±0.47 | — | 81.41±0.35 |
| MoBY | 80.02±0.16 | — | — | — |
| MAE | — | 78.97±0.65 | — | — |
| SimMIM | — | 79.92±0.04 | 81.97±0.20 | — |

FIG. 8

Table 7 - 1001

| Method - 1070 | Pre-Training Data - 1075 | | |
|---|---|---|---|
| | ImageNet-1k (1076) | AllX-rays (1077) | ImageNet-1k + AllX-rays (1078) |
| DINO+ViT Base (1071) | 78.37±0.47 | 79.77±0.37 | 82.08±0.13 |
| SimMIM+Swin Base (1072) | 81.97±0.20 | 82.16±0.05 | 82.98±0.10 |

FIG. 10A

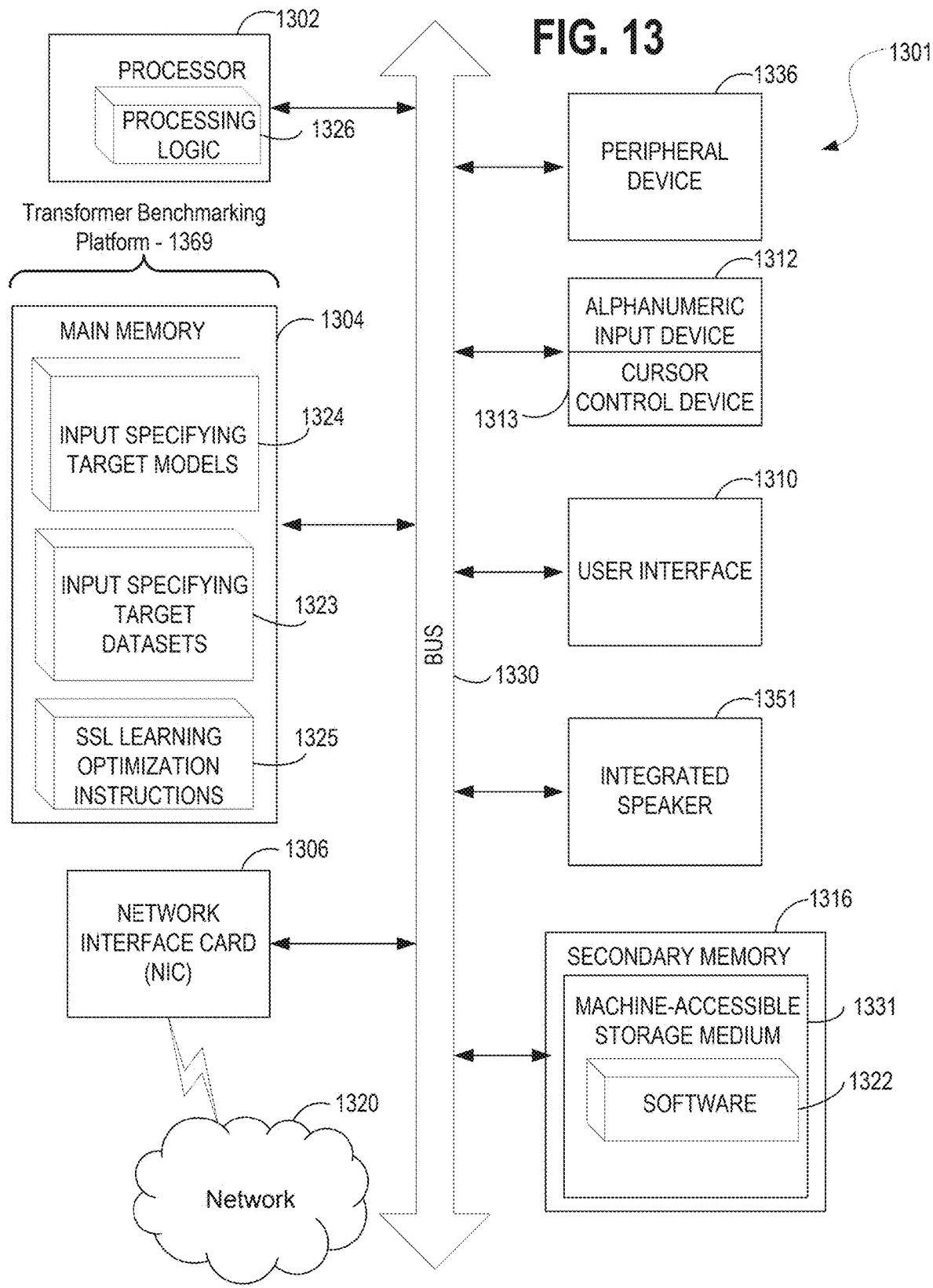

SYSTEMS, METHODS, AND APPARATUSES FOR IMPLEMENTING SELF-SUPERVISED DOMAIN-ADAPTIVE PRE-TRAINING VIA A TRANSFORMER FOR USE WITH MEDICAL IMAGE CLASSIFICATION

CLAIM OF PRIORITY

This non-provisional U.S. Utility Patent Application is related to, and claims priority to the U.S. Provisional Patent Application No. 63/323,988, entitled "SYSTEMS, METHODS, AND APPARATUSES FOR IMPLEMENTING BENCHMARKING VISION TRANSFORMERS FOR USE WITH CHEST X-RAYS CLASSIFICATION," filed Mar. 25, 2022, and is further related to, and claims priority to, the U.S. Provisional Patent Application No. 63/405,262, entitled "SYSTEMS, METHODS, AND APPARATUSES FOR IMPLEMENTING SELF-SUPERVISED DOMAIN-ADAPTIVE PRE-TRAINING WITH A TRANSFORMER FOR USE WITH MEDICAL IMAGE CLASSIFICATION," filed Sep. 9, 2022, the entire contents of each being incorporated herein by reference as though set forth in full.

GOVERNMENT RIGHTS AND GOVERNMENT AGENCY SUPPORT NOTICE

This invention was made with government support under R01 HL128785 awarded by the National Institutes of Health. The government has certain rights in the invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of medical imaging and analysis using convolutional neural networks and transformers for the classification and annotation of medical images, and more particularly, to systems, methods, and apparatuses for implementing self-supervised domain-adaptive pre-training via a transformer for use with medical image classification in the context of medical image analysis and additionally relate to the systems, methods, and apparatuses for systematically benchmarking vision transformers for use with chest x-ray classification, specifically in which trained models are utilized for processing medical images.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Machine learning models have various applications to automatically process inputs and produce outputs considering situational factors and learned information to improve output quality. One area where machine learning models, and neural networks in particular, provide high utility is in the field of processing medical images.

Within the context of machine learning and with regard to deep learning specifically, a Convolutional Neural Network (CNN, or ConvNet) is a class of deep neural networks, very often applied to analyzing visual imagery. Convolutional Neural Networks are regularized versions of multilayer perceptrons. Multilayer perceptrons are fully connected networks, such that each neuron in one layer is connected to all neurons in the next layer, a characteristic which often leads to a problem of overfitting of the data and the need for model regularization. Convolutional Neural Networks also seek to apply model regularization, but with a distinct approach. Specifically, CNNs take advantage of the hierarchical pattern in data and assemble more complex patterns using smaller and simpler patterns. Consequently, on the scale of connectedness and complexity, CNNs are on the lower extreme.

Also used within the context of machine learning are Vision Transformers (ViTs). A Vision Transformer is a transformer that is targeted at vision processing tasks such as image recognition. Transformers found their initial applications in natural language processing (NLP) tasks, as demonstrated by language models such as BERT and GPT-3. By contrast, the typical image processing system uses a convolutional neural network (CNN). Well-known projects include Xception, ResNet, EfficientNet, DenseNet, and Inception.

Image transformers operate by dividing an image into fixed-size patches, correctly embedding each of the patches, and concatenating positional embedding as an input to a transformer encoder. While the transformer architecture has become the de-facto standard for natural language processing tasks, its applications to computer vision are only now being realized. For instance, the Vision Transformer (ViT) type image transformer attains excellent results compared to state-of-the-art convolutional networks while requiring substantially fewer computational resources to train, while a Swin transformer can serve as a general-purpose backbone for computer vision. Challenges remain, however, in adapting transformers from language to vision due to differences between the two domains, such as large variations in the scale of visual entities and the high resolution of pixels in images compared to words in text.

Unlike CNNs, Transformers measure the relationships between pairs of input tokens (words in the case of text strings), termed attention. The cost is exponential with the number of tokens. For images, the basic unit of analysis is the pixel. However, computing relationships for every pixel pair in a typical image is prohibitive in terms of memory and computation. Instead, ViT computes relationships among pixels in various small sections of the image (e.g., 16×16 pixels), at a drastically reduced cost. The sections (with positional embeddings) are placed in a sequence. The embeddings are learnable vectors. Each section is arranged into a linear sequence and multiplied by the embedding matrix. The result, with the position embedding is fed to the transformer. The architecture for image classification is the most common and uses only the Transformer Encoder in order to transform the various input tokens. However, there are also other applications in which the decoder part of the traditional Transformer Architecture is also used.

Heretofore, self-supervised learning has been sparsely applied in the field of medical imaging. Nevertheless, there is a massive need to provide automated analysis to medical imaging with a high degree of accuracy so as to improve diagnosis capabilities, control medical costs, and to reduce workload burdens placed upon medical professionals.

Not only is annotating medical images tedious and time-consuming, but it also demands costly, specialty-oriented expertise, which is not easily accessible.

What is needed is an improved technique for leveraging the capabilities of vision transformer methodologies.

The present state of the art may therefore benefit from the systems, methods, and apparatuses for systematically benchmarking vision transformers for use with chest x-ray classification, and may further benefit from the systems, methods, and apparatuses for implementing self-supervised domain-adaptive pre-training via a transformer for use with medical image classification, each being described herein.

BRIEF DESCRIPTION OF THE DRAWINGS

Embodiments are illustrated by way of example, and not by way of limitation, and can be more fully understood with reference to the following detailed description when considered in connection with the figures in which:

FIGS. 1A, 1B, and 1C depict that within the context of medical imaging, good initialization is more vital for transformer-based models than for CNNs, in accordance with described embodiments;

FIG. 4 depicts Table 3 which shows benchmarking transfer learning with transformers (e.g., using ViT-B and Swin-B transformers) ImageNet pre-trained models on six medical image classification tasks, in accordance with described embodiments;

FIG. 5 depicts Table 4 which shows the creation of a large-scale dataset, namely X-ray(926K), by collecting 926,028 images from 13 different chest X-ray datasets, in accordance with described embodiments;

FIGS. 7A and 7B depict a flow diagram illustrating a method for systematically implementing self-supervised domain-adaptive pre-training via a transformer for use with medical image classification, in accordance with disclosed embodiments;

FIG. 8 depicts Table 6 illustrating performance of the disclosed methodology when compared with prior known techniques;

FIG. 10A depicts Table 7 at element showing the performance of the disclosed methodology for different pre-training data sets;

FIG. 13 illustrates a diagrammatic representation of a machine in the exemplary form of a computer system, in accordance with one embodiment.

DETAILED DESCRIPTION

Figure 1B:
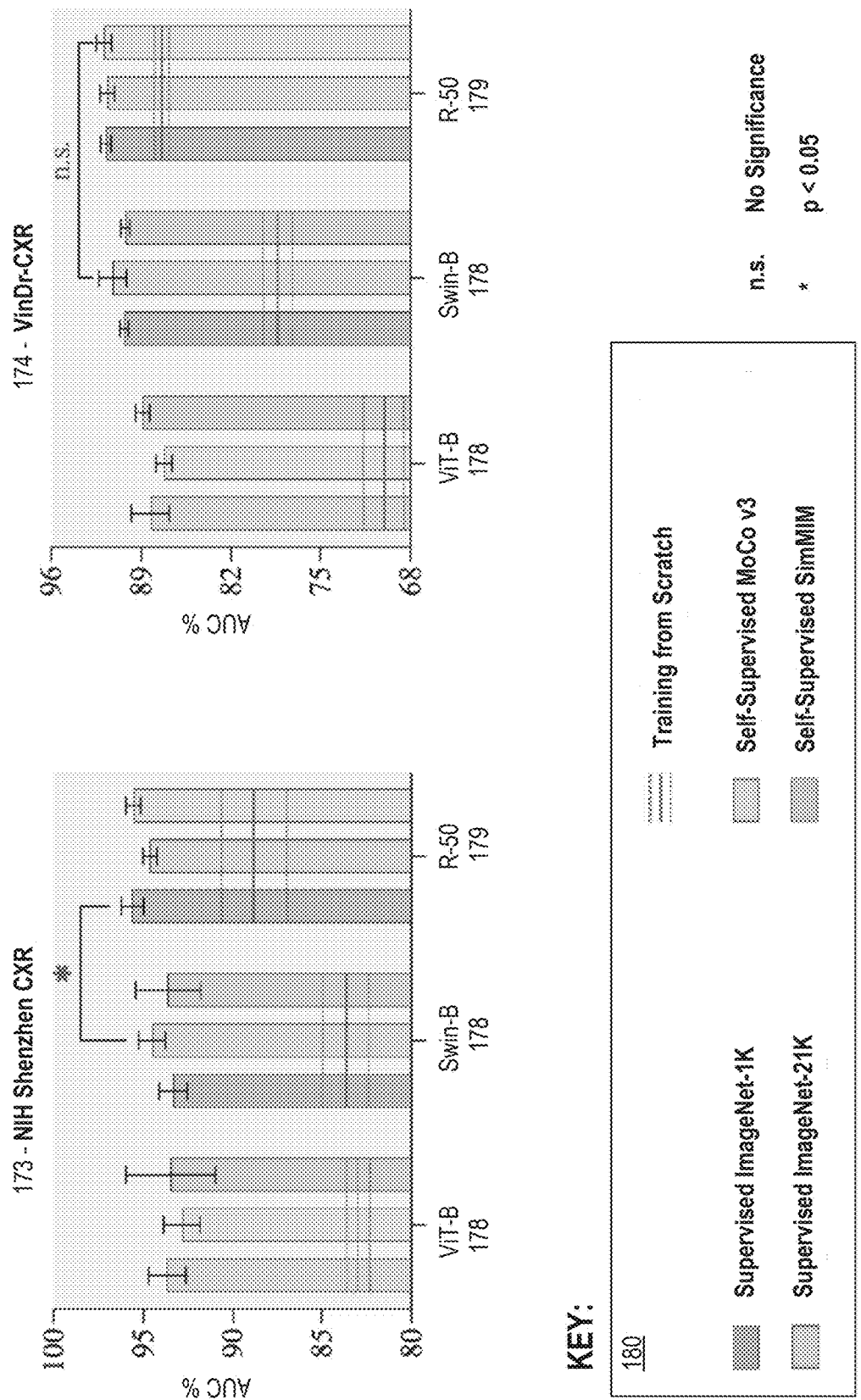

Described herein are systems, methods, and apparatuses for implementing self-supervised domain-adaptive pre-training via a transformer for use with medical image classification in the context of medical image analysis. Further described are systems, methods, and apparatuses for systematically benchmarking vision transformers for use with chest x-ray classification.

In the field of medical image analysis, vision transformer-based self-supervised learning (SSL) approaches have recently shown substantial success in the computer vision technical arts as such approaches outrank convolutional neural networks (CNNs) in one representative visual benchmark after another. However, the competition between visual transformers and CNNs in medical imaging is rarely studied, leaving many important questions unanswered.

Set forth herein are benchmarks demonstrating how well existing transformer variants that use various (supervised and self-supervised) pre-training techniques perform against CNNs on a variety of medical classification tasks. Given the data-hungry nature of transformers and the annotation-deficiency challenge of medical imaging, a practical approach is described herein for bridging the domain gap between photographic and medical images by utilizing unlabeled large-scale in-domain data.

Through extensive empirical evaluations, the following insights in medical imaging are revealed: First, good initialization is more crucial for transformer-based models than for CNNs. Secondly, self-supervised learning based on masked image modeling captures more generalizable representations than supervised models. Third, assembling a larger-scale domain-specific dataset can better bridge the domain gap between photographic and medical images via self-supervised continuous pre-training.

Through the benchmark study set forth below and the novel methodologies for bridging the domain gap between photographic and medical images through the use of unlabeled large-scale in-domain data, future research may thus build upon the inventive concepts set forth herein and thus extend the capability of applying transformers to medical imaging analysis.

Introduction

Visual transformers have recently demonstrated the potential to be considered a viable alternative to CNNs in visual recognition. Though visual transformers have attained state-of-the-art (SOTA) performance across a variety of computer vision tasks, their architectures lack convolutional inductive bias, making them more data-hungry than prior known CNN architectures and techniques.

Given the data-hungry nature of transformers and the challenge of annotation scarcity in medical imaging, the efficacy of existing visual transformers in medical imaging is unknown. The analysis set forth herein reveals that on medical target tasks with limited annotated data, transformers lag behind CNNs in random initialization (scratch) settings. To overcome the challenge of annotation dearth in medical imaging, transfer learning from ImageNet pre-trained models has become a common practice.

As such, the inventors sought out to answer the following question: "To what extent can ImageNet pre-training elevate transformers' performance to rival CNNs in medical imaging?"

Meanwhile, self-supervised learning (SSL) has drawn great attention in medical imaging due to its remarkable success in overcoming the challenge of annotation dearth in medical imaging. The goal of the SSL paradigm is to learn general-purpose representations without using human-annotated labels. Masked image modeling (MIM) methods, in addition to supervised pre-training, have recently emerged as promising SSL techniques for transformer models. The basic idea behind MIM-based methods is to learn representations by (randomly) masking portions of the input image and then recovering the input image at the masked areas. Recent advancements in MIM-based techniques have resulted in SSL techniques that outperform supervised pre-trained models in a variety of computer vision tasks. As a result, the inventors further sought to answer the additional question: "How generalizable are MIM-based self-supervised methods to medical imaging in comparison to supervised ImageNet pre-trained models?"

Further still, the marked differences between photographic and medical images may result in a mismatch in learned features between the two domains, which is referred to as a "domain gap." Recent advancements demonstrate that using a CNN as the backbone, a moderately-sized medical image dataset is sufficient to bridge the domain gap between photographic and medical images via supervised continual pre-training. Again, owing to the data-hungry nature of transformers, the inventors investigated domain-adaptive pre-training in an SSL setting, thus arriving upon a third question to be answered, as follows: "How to scale up a domain-specific dataset for a transformer architecture to bridge the domain gap between photographic and medical images?"

In the context of addressing the three questions above, a benchmarking study was conducted to assess the efficacy of transformer-based models on numerous medical classification tasks involving different diseases (thorax diseases, lung pulmonary embolism, and tuberculosis) and modalities (X-ray and CT) and to develop the new innovative methodologies which are described in greater detail below.

Very specifically, the benchmarking study (1) investigated the importance of pre-training for transformers versus CNNs in medical imaging; (2) assessed the transferability of state-of-the-art MIM-based self-supervised method to a diverse set of medical image classification tasks; and (3) investigated domain-adaptive pre-training on large-scale photographic and medical images to tailor self-supervised ImageNet models for target tasks on chest X-rays.

An extensive empirical study yielded the following findings: Firstly, (1) In medical imaging, good initialization is more vital for transformer-based models than for CNNs (see FIGS. 1A, 1B, and 1C); secondly, (2) MIM-based self-supervised methods capture finer-grained representations that can be useful for medical tasks better than supervised pre-trained models (see Table 1 as set forth at FIG. 2); and thirdly, (3) Continuous self-supervised pre-training of the self-supervised ImageNet model on large-scale medical images bridges the domain gap between photographic and medical images, providing more generalizable pre-trained models for medical image classification tasks (see Table 2 as set forth at FIG. 3). The benchmarking study is additionally contrasted with related works in the remarks that follow to help further emphasize the novel techniques which are presented herein.

Benchmarking Setup:

Transformer Backbones—In the target tasks in all experiments, two representative recent state-of-the-art transformer backbones were taken, including Vision Transformer (ViT) and Swin Transformer (Swin). Visual transformer models, which have recently emerged as alternatives to convolutional neural networks (CNNs), have revolutionized computer vision fields. The groundbreaking work of ViT showcases how transformers can completely replace the CNNs backbone with a convolution-free model. Although ViT attains state-of-the-art image classification performance, the ViT transformer architecture may not be suitable for use on dense vision tasks, such as object detection, segmentation, etc. Conversely, the Swin transformer architecture utilizes a general-purpose transformer backbone to address this problem by building hierarchical feature maps, resulting in state-of-the-art accuracy on object detection segmentation tasks.

For transfer learning to the classification target tasks, the transformer is taken as a pre-trained model and a task-specific classification head is then added. The transfer learning performance of all pre-trained models are further assessed by fine-tuning all layers in the downstream networks.

Target Tasks and Datasets—Further considered are a diverse suite of six common but challenging medical classification tasks including NIH ChestX-ray14, CheXpert, VinDr-CXR, NIH Shenzhen CXR, RSNA PE Detection, and RSNA Pneumonia. These tasks encompass various diseases (thorax diseases, lung pulmonary embolism, and tuberculosis) and modalities (X-ray and CT). The evaluations conducted adopted the official split of these datasets, when available. Otherwise, the data was randomly divided into 80% and 20% subsets for training and testing, respectively.

AUC (area under the ROC curve) was used to measure the performance of multi-label classification target tasks (e.g., NIH ChestXray14, CheXpert, and VinDr-CXR) and binary classification target tasks (e.g., NIH Shenzhen CXR and RSNA PE). Accuracy was used to evaluate multi-class classification target task (RSNA Pneumonia) performance. The mean and standard deviation of performance metrics over ten runs were reported for all experiments, and statistical analyses based on an independent two sample t-test are presented below.

FIGS. 1A, 1B, and 1C depict that within the context of medical imaging, good initialization is more vital for transformer-based models than for CNNs.

Specifically shown at FIG. 1A are results for the NIH ChestX-ray14 (element 171) and CheXpert at element 172. FIG. 1B provides results for NIH Shenzhen CXR at element 173 and VinDr-CXR at element 174. FIG. 1C provides results for RSNA Pneumonia at element 175 and RSNA PE at element 176. All are provided with AUC % results across ViT-B (element 177), Swin-B (element 178), and R-50 (element 179) according to the training methods set forth by the key at element 180.

For instance, when training from scratch, transformers performed significantly worse than CNNs on all target tasks. However, with supervised or self-supervised pre-training on ImageNet, transformers were demonstrated to offer the same results as CNNs, highlighting the importance of pre-training when using transformers for medical imaging tasks. Statistical analysis was further conducted between the best of six pre-trained transformer models and the best of three pre-trained CNN models.

Benchmarking Transformers

Pre-training is more vital for transformer-based models than for CNNs in medical imaging: Transformers have recently attained state-of-the-art results and surpassed CNNs in a variety of computer vision tasks. However, the lack of convolutional inductive bias in transformer architectures makes them more data-hungry than CNNs. Therefore, to rival CNNs in vision tasks, transformers require millions and even sometimes, billions of labeled data. Given the data-hungry nature of transformers and the challenge of annotation scarcity in medical imaging, it is natural to question whether transformers can compete with CNNs when used directly on medical imaging applications.

Preliminary analysis shows that in random initialization settings (e.g., initializing from scratch), transformers lag behind CNNs on medical target tasks with limited annotated data. Taken together, it was therefore hypothesized that in medical imaging, transformers require pre-trained models to rival with CNNs. To put this hypothesis to the test, experiments were conducted to empirically validate how well the transformer variants (ViT-B and Swin-B) that use various (supervised and self-supervised) pre-training methods compete with CNNs on a range of medical classification tasks. Specifically, six newly-developed transformer models and three CNN models were benchmarked.

Experimental Setup: The transferability of various popular transformer methods were evaluated with officially released models on six diverse medical classification tasks. The goal was to investigate the importance of pre-training for transformers versus CNNs in medical imaging. In view of this goal, six popular transformer pre-trained models with ViT-B and Swin-B backbones were used as well as three standard CNNs pre-trained models with ResNet-50 backbones that are already official and ready to use. Specifically, for supervised pre-training, the official pre-trained ViT-B, Swin-B, and ResNet-50 on ImageNet-21K and pre-trained Swin-B and ResNet-50 on ImageNet-1K pre-trained models were utilized. For self-supervised pre-training, the pre-trained ViT-B and Swin-B models were utilized with simMIM on ImageNet1K, as well as pre-trained ViT-B and ResNet-50 models with MoCo v3 on ImageNet-1K. The differences in pre-training data (ImageNet-1K or ImageNet-21K) are due to the availability of official pre-trained models.

Results and Analysis: The results of the evaluations as set forth at FIGS. 1A, 1B, and 1C, suggest three major findings. Firstly, in random initialization (scratch) settings (horizontal lines), transformers (e.g., ViT-B and/or Swin-B) cannot compete with CNNs (e.g., such as ResNet-50) in medical applications, as they offer performance equal to or even worse than CNNs. This inferior performance is attributable to the respective transformer's lack of desirable inductive bias in comparison to CNNs, which has a negative impact on transformer performance on medical target tasks with limited annotated data. Secondly, Swin-B backbone consistently outperforms ViT-B across all target tasks. This reveals the importance of hierarchical inductive bias, embedded in the Swin-B backbone, in elevating the performance of transformer-based models in medical image analysis. Thirdly, with supervised or self-supervised pre-training on ImageNet, transformers can offer competitive performance in comparison to CNNs, emphasizing the importance of pre-training when using transformers for medical imaging tasks. In particular, the best of six pre-trained transformer models outperform the best of three pre-trained CNN models in all target tasks, with the exception of NIH Shenzhen CXR, which can be attributed to a lack of sufficient training data (only 463 samples).

Self-supervised learning based on masked image modeling is a preferable option to supervised baselines for medical imaging: Visual transformer models, while powerful, are nevertheless prone to over-fitting and rely heavily on supervised pre-training on large-scale image datasets, such as JFT-300M and ImageNet-21K. In addition to supervised pre-training, self-supervised learning (SSL) techniques account for a substantial part of pre-trained transformer models.

Masked Image Modeling (MIM) is an approach in which portions of the input image signals are randomly masked and then the original input signals are subsequently recovered at the masked area. Such a technique has recently received great attention in computer vision for pre-training transformers in a self-supervised manner. The MIM-based self-supervised methods are widely accepted to capture more task-agnostic features than supervised pre-trained models, making them better suited for fine-tuning on various vision tasks.

It was therefore hypothesized that existing self-supervised transformer models pre-trained on photographic images would outperform supervised transformer models in the medical image domain, where there is a significant domain shift between medical and photographic images. To test this hypothesis, two recent state-of-the-art transformer backbones were considered, namely ViT-B and Swin-B, and experiments then compared their supervised and self-supervised pre-trained models for various medical image classification tasks.

Experimental Setup: To investigate the efficacy of self-supervised and supervised pre-trained transformer models in medical imaging, the experiments utilized existing supervised and state-of-the-art self-supervised (e.g., SimMIM) pre-trained models with two representative transformer backbones, ViT-B and Swin-B; all pre-trained models are fine-tuned on six different medical classification tasks.

To provide a comprehensive evaluation, results are also included for the training of these two architectures from scratch. SimMIM was utilized instead of the concurrent MAE as the representative MIM-based method because SimMIM has demonstrated superior performance to MAE in medical image analysis.

Figure 2:
FIG. 2 depicts Table 1 which shows that a self-supervised SimMIM model with the Swin-B backbone outperforms fully-supervised baselines, in accordance with described embodiments.

FIG. 2 depicts Table 1 (element 201) which shows that a self-supervised SimMIM model with the Swin-B backbone outperforms fully-supervised baselines, in accordance with described embodiments. The best methods are bolded while the second best are underlined. For every target task, statistical analysis was conducted between the best (bolded) vs. others. The shaded/highlighted boxes indicate no statistically significant difference at the $p=0.05$ level.

Results and Analysis: As shown in Table 1, the self-supervised SimMIM model with the Swin-B backbone performs significantly better or on-par compared with both supervised baselines with either ViT-B or Swin-B backbones across all target tasks. The same observation of MIM-based models outperforming their supervised counterparts also exists in the finer-grained visual tasks, e.g., object detection and medical image segmentation.

Rather than the finer-grained visual tasks, the evaluation results of Table 1 focused on coarse-grained classification tasks. Furthermore, it was observed that the SimMIM model with the Swin-B backbone consistently outperforms its counterpart with the ViT-B backbone in all cases, implying that the Swin-B backbone may be a superior option for medical imaging tasks to ViT-B. These findings suggest that the self-supervised SimMIM model with the Swin-B backbone could be a viable option for pre-training deep models in medical imaging applications.

Self-supervised domain-adaptive pre-training on a larger-scale domain-specific dataset better bridges the domain gap between photographic and medical imaging: Domain adaptation seeks to improve target model performance by reducing domain disparities between source and target domains. It has been demonstrated that domain-adaptive pre-training can bridge the domain gap between natural and medical images. Particularly, by first pre-training a CNN model (e.g., ResNet-50) on ImageNet and then training on domain-specific datasets (e.g., NIH ChestX-ray14 or CheXpert), it has been shown that domain-adaptive pre-training can tailor the ImageNet models to medical applications.

Therefore, domain-adaptive pre-training was investigated in the context of visual transformer architectures. Given the data-hungry nature of transformers and the annotation-dearth challenge of medical imaging, the SSL pre-training approach was used to bridge the domain gap between photographic and medical images. Since no expert annotation is required in SSL pre-training, it was possible to assemble multiple domain-specific datasets into a large-scale dataset, overcoming the limitations of prior known techniques which have been limited to using only a single dataset.

Experimental Setup: The transferability of five different self-supervised SimMIM models were evaluated with the Swin-B backbone by utilizing three different pre-training datasets, including ImageNet, ChestX-ray14, and X-rays (926K), which is a large-scale dataset that was created by collecting 926,028 images from 13 different chest X-ray datasets. To do so, the evaluation utilized the SimMIM released ImageNet model as well as two models pre-trained on ChestX-ray14 and X-rays(926K) using SimMIM. Still further, two new models were created that were initialized through the self-supervised ImageNet pre-trained model followed by self-supervised pre-training on ChestX-ray14 (ImageNet→ChestX-ray14) and X-rays(926K) (ImageNet→X-rays(926K)). Every pre-training experiment was trained for 100 epochs using the default SimMIM settings.

Figure 3:
FIG. 3 depicts Table 2 which shows that domain-adapted pre-trained model which utilized a large number of in-domain data (e.g., X-rays(926K)) in an SSL manner achieves the best performance across all five target tasks, in accordance with described embodiments.

FIG. 3 depicts Table 2 (element 301) which shows that domain-adapted pre-trained model which utilized a large number of in-domain data (e.g., X-rays(926K)) in an SSL manner achieves the best performance across all five target tasks, in accordance with described embodiments. The best methods are bolded while the second best are underlined. For each target task, the independent two sample t-test was conducted between the best (bolded) vs. the others. The absence of a statistically significant difference at the p=0.05 level is indicated by shaded/highlighted boxes.

Results and Analysis: The following observations may be drawn from the results as set forth by Table 2. Firstly, (1) the X-rays(926K) model consistently outperforms the ChestX-ray14 model in all cases. This observation suggests that scaling the pre-training data can significantly improve the self-supervised transformer models. Secondly, (2) while the X-rays(926K) model uses fewer images in the pre-training dataset than the ImageNet model, it shows superior or comparable performance over the ImageNet model across all target tasks. This implies that, whenever possible, in-domain medical transfer learning should be preferred over ImageNet transfer learning. Thirdly, (3) the overall trend highlights the benefit of domain-adaptive pre-training, which leverages the ImageNet model's learning experience and further refines it with domain-relevant data.

Specifically, fine-tuning both domain-adapted models (ImageNet→ChestX-ray14 and ImageNet→X-rays(926K)) outperforms ImageNet and corresponding in-domain models in all target tasks, with one exception. As shown by the results of Table 2, for CheXpert, the ImageNet→ChestX-ray14 model performs worse in CheXpert than the corresponding ImageNet model. This exception suggests that the in-domain pre-training dataset should be larger than the target dataset. It is noteworthy that this gap was filled later by ImageNet→X-rays(926K) model, which utilized more in-domain data. This highlights the significance of larger-scale medical data in improving the transformers' ability to learn more discriminative representations.

FIG. 4 depicts Table 3 (element 401) which shows benchmarking transfer learning with transformers (e.g., using ViT-B and Swin-B transformers) ImageNet pre-trained models on six medical image classification tasks, in accordance with described embodiments. The best methods are bolded while the second best are underlined. For each target task, the independent two sample t-test was conducted between the best (bolded) vs. the others. The absence of a statistically significant difference at the p=0.05 level is indicated by shaded/highlighted boxes. For comparison with CNNs, four pre-trained models were evaluated with ResNet-50 backbones. To provide a comprehensive evaluation, results for the training of these three architectures from scratch is also provided.

FIG. 5 depicts Table 4 (element 501) which shows the creation of a large-scale dataset, namely X-ray(926K), by collecting 926,028 images from 13 different chest X-ray datasets, in accordance with described embodiments. For the datasets that have an official training and testing data split, only the training set portion was utilized.

The Large-Scale Domain-Specific Dataset

Given the data-hungry nature of transformers and the annotation-deficiency challenge of medical imaging, a practical approach for bridging the domain gap between photographic and medical images is provided through the utilization of unlabeled large-scale in-domain data. Specifically, 926,028 images were assembled from 13 chest X-ray datasets into a single aggregated large-scale dataset. Each of the datasets used are listed at Table 4 as set forth by FIG. 5, discussed above.

Figure 6:
FIG. 6 depicts Table 5 shows that continual pre-training on a large-scale domain-specific dataset (ImageNet→X-ray (926K)) via self-supervised SimMIM method achieves state-of-the-art performance on the NIH ChestX-ray14 target task, in accordance with described embodiments.

FIG. 6 depicts Table 5 (element 601) shows that continual pre-training on a large-scale domain-specific dataset (ImageNet→X-ray(926K)) via self-supervised SimMIM method achieves state-of-the-art performance on the NIH ChestX-ray14 target task, in accordance with described embodiments.

State-of-the-Art Performance

The domain-adapted model pre-trained using the large-scale domain-specific dataset that was assembled, (e.g., the X-ray(926K)), achieves state-of-the-art performance when transferred to the NIH ChestX-ray14 dataset. The result of the best model evaluated is presented by Table 5, with the results of other state-of-the-art methods.

Improvements Over all Prior Known Methodologies

The described methodologies and techniques as set forth herein go far beyond the mere benchmarking of existing transformer models for medical imaging. Importantly, a domain-adaptive continual pre-training strategy has been disclosed which critically operates in a purely self-supervised manner using a large-scale domain-specific dataset. Such a technique has never been successfully demonstrated before, much less in the context of medical imaging.

Unlike prior known techniques which apply transformers to medical imaging, the novel methodologies as set forth herein not only are used to demonstrate a successful evaluation of the capabilities, especially with respect to transferabilities of various transformer models on medical tasks, but also shows how to improve their performance for specific medical tasks.

For instance, according to an exemplary embodiment, the transformer's performance is strengthened by gradually scaling up the pre-training data to 926,028 images from 13 different sources (refer again to the results discussed above with reference to Table 2 as set forth at FIG. 3).

Unfortunately, datasets created at different sites tend to be annotated differently, resulting in a historical lack of compatibility between them. For example, ChestX-ray14, CheXpert, MIMIC-CXR, and VinDr-CXR are all datasets for chest X-rays, but VinDr-CXR is associated with global (image-level) and local (boxed-lesions) labels. Similarly, the MIMIC-CXR dataset has no expert annotations whatsoever, and yet is provided with associated radiological reports. Each of ChestX-ray14 and CheXpert cover 14 conditions at the image level, and their 14 conditions have overlaps, and yet, are not exactly the same.

As described herein, through the utilization of datasets from different sources (sites, hospitals, medical centers, etc.), it is possible and preferable to increase data diversity which thus in turn, boosts the potential performance and robustness of the trained models. And yet, supervised learning techniques simply cannot handle this annotation disparity between available datasets.

Thus, the ability to overcome and bridge the gap between the divergent domains results in improvements to, and a significant contribution to the field of medical image analysis and classification through the use of the self-supervised domain-adaptive strategy set forth herein which specifically operates to scale up data utilization for pre-training (refer again to the discussion above entitled "Self-supervised domain-adaptive pre-training on a larger-scale domain-specific dataset better bridges the domain gap between photographic and medical imaging.").

Consequently, the evaluation results provided at Table 2 as set forth at FIG. 3 show that the novel self-supervised domain-adaptive strategy, when used in conjunction with scaling up the pre-training data from multiple sources (e.g., such as disparate sites, hospitals, medical centers, etc.) significantly improves the performance of transformer models on medical tasks.

For instance, by training a domain-adapted model (ImageNet→X-rays(926K)), which leverages the learning experience with photographic images and further refines via self-supervision with large-scale domain-relevant data, the best performance across all target tasks was demonstrably achieved. Through the use and practice of the novel techniques presented herein, contributions to the advancement of the field of medical imaging analysis includes at least the following important contributions: (1) First, a systematic benchmarking analysis of the performance of existing transformer variants against CNNs that use various (supervised and self-supervised) pre-training methods on a variety of medical classification tasks. (2) Second, a successfully validated technique for bridging the domain gap between photographic and medical images by utilizing a largescale in-domain dataset from multiple sources via self-supervision. (3) Third, a collection of domain-specific models that offer state-of-the-art performance by pre-training first with photographic images (e.g., with the photographic images being from a first domain type) and then adapting via self-supervision with large-scale medical images (e.g., with the medical images being from second domain type). (4) Fourth, a set of answers to three critical questions about transformers used in medical imaging, revealing the following insights: (i) firstly, that good initialization is more crucial for transformer-based models than for CNNs, (ii) self-supervised learning may capture more generalizable representations than supervised learning, and (iii) using a larger-scale domain-specific dataset can bridge the domain gap between photographic and medical images via self-supervised continuous pre-training.

Benefits of the Disclosed Methodologies

The described embodiments therefore manifest an up-to-date benchmark study which sheds light on the efficacy and limitations of existing visual transformer models in medical image classification when compared to CNN counterparts. The extensive experiments yield important findings: Firstly, (1) a good pre-train model can allow visual transformers to compete with CNNs on medical target tasks with limited annotated data; secondly, (2) MIM-based self-supervised methods, such as SimMIM, play an important role in pre-training visual transformer models, preventing them from over-fitting in medical target tasks; and thirdly, (3) assembling multiple domain-specific datasets into a single aggregated larger-scale dataset can better bridge the domain gap between photographic domain images and medical domain imaging via continual SSL pre-training.

Although many transformer-based U-Net architectures have been developed for 3D medical image segmentation, it is nevertheless helpful to perform the comprehensive benchmarking study of transformers for medical image analysis. Thus, through the utilization of the novel methodologies set forth herein, further evaluation of additional modalities and medical image segmentation tasks may prove beneficial to the state of the art.

Figure 7A:
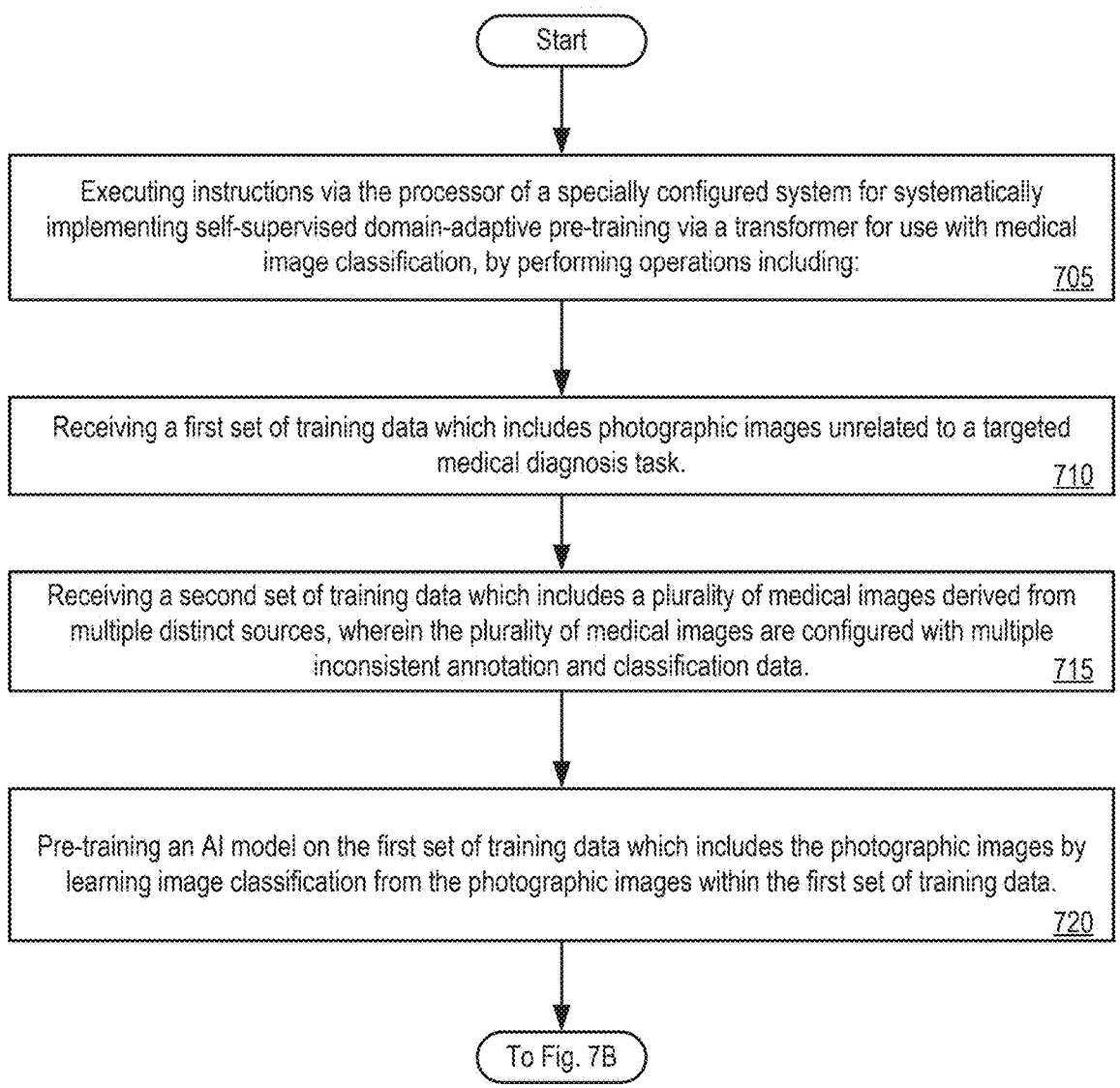

FIGS. 7A and 7B depict a flow diagram illustrating a method 701-702 for systematically implementing self-supervised domain-adaptive pre-training via a transformer for use with medical image classification, in accordance with disclosed embodiments. Method 701-702 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the system 1101 (see FIG. 11) and the machine 1301 (see FIG. 13) and the other supporting systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 701-702 depicted at FIGS. 7A and 7B, starting at block 705, there is a method performed by executing instructions via the processor of a specially configured system for systematically implementing self-supervised domain-adaptive pre-training via a transformer for use with medical image classification. Such a system may be configured with at least a processor and a memory to execute specialized instructions which cause the system to perform the following operations:

At block 710, processing logic receives a first set of training data which includes photographic images unrelated to a targeted medical diagnosis task.

At block 715, processing logic receives a second set of training data which includes a plurality of medical images derived from multiple distinct sources, in which the plurality of medical images are configured with multiple inconsistent annotation and classification data.

At block 720, processing logic Pre-training an AI model on the first set of training data which includes the photographic images by learning image classification from the photographic images within the first set of training data.

Transitioning from FIG. 7A to the processing which continues at FIG. 7B, the processing of method 701-702 resumes at block 730.

At block 730, processing logic executes instructions via the processor of the system for performing domain-adaptive pre-training of the AI model via self-supervised learning operations, in which the AI model previously trained on the first set of training data applies domain-adaptive learning to scale up data utilization of the second set of training data within the AI model's learned image classifications.

At block 735, processing logic generates a trained domain-adapted AI model by fine-tuning the AI model against the targeted medical diagnosis task using the second set of training data which includes the plurality of medical images.

At block 740, processing logic outputs the trained domain-adapted AI model.

At block 745, processing logic executes the trained domain-adapted AI model to generate a predicted medical diagnosis from an input image which forms no part of the first or second sets of training data.

According to another embodiment of method 701-702, pre-training the AI model on the first set of training data generates a trained AI model; and in which performing domain-adaptive pre-training of the AI model via self-supervised learning operations generates a trained domain-adapted AI model by fine-tuning the trained AI model against the targeted medical diagnosis task using the second set of training data which includes the plurality of medical images.

According to another embodiment, method 701-702 further includes: performing in-domain medical transfer learning for via the trained domain-adapted AI model by prioritizing all in-domain medical transfer learnings derived from the second set of training data which includes the plurality of medical images over any out-of-domain learnings derived from the pre-training of the AI model on the first set of training data generates a trained AI model.

According to another embodiment of method 701-702, prioritizing all in-domain medical transfer learnings is configured to improve performance of the trained domain-adapted AI model by reducing domain disparities between a source domain corresponding to the first set of training data and a target domain corresponding to the second set of training data which includes the plurality of medical images.

According to another embodiment of method 701-702, receiving the first set of training data which includes photographic images unrelated to a targeted medical diagnosis task includes receiving photographic images corresponding to a first domain type which lacks medical imaging data.

According to another embodiment of method 701-702, receiving the second set of training data which includes a plurality of medical images includes receiving medical imaging data corresponding to a second domain type having at least a sub-set of the plurality of medical images correlated to the targeted medical diagnosis task.

According to another embodiment of method 701-702, receiving the first set of training data which includes photographic images unrelated to a targeted medical diagnosis task includes receiving a set of non-domain specific photographic images lacking any images correlated to the targeted medical diagnosis task.

According to another embodiment, method 701-702 further includes: receiving, at the system, multiple medical imaging training data sets from multiple distinct sources; aggregating the multiple medical imaging training data sets into a single aggregated medical imaging dataset; and in which, receiving at the system, the second set of training data which includes the plurality of medical images derived from multiple distinct sources includes specifying the single aggregated medical imaging dataset as the second set of training data for performing the domain-adaptive pre-training of the AI model.

According to another embodiment of method 701-702, receiving the second set of training data which includes the plurality of medical images derived from multiple distinct sources includes training data incompatible with supervised learning for the AI model.

According to another embodiment of method 701-702, the plurality of medical images received with the second set of training data are configured with multiple inconsistent annotation and classification data including at least two or more of: inconsistent annotations across a sub-set of the plurality of medical images for the targeted medical diagnosis task; inconsistent annotations across a sub-set of the plurality of medical images for a common disease condition represented within the plurality of medical images; inconsistent annotations across a sub-set of the plurality of medical images for a common human anatomical feature classified within the plurality of medical images; inconsistent global level image annotations identifying disease conditions within an image and local level boxed-lesion labels identifying disease conditions within bounding boxes present within the plurality of medical images; inconsistent use of expert annotations for the plurality of medical images with at least a first portion of the plurality of medical images including expert annotations and at least a second portion of the plurality of medical images lacking any expert annotations; and inconsistent use of radiological reports associated with the plurality of medical images with at least a first portion of the plurality of medical images having radiological reports associated with them and at least a second portion of the plurality of medical images lacking any associated radiological reports.

According to another embodiment of method 701-702, performing the domain-adaptive pre-training of the AI model via the self-supervised learning operations, bridges a domain gap between photographic images from the first set of training data representing a first domain and medical images from the second set of training data representing a second domain; in which the self-supervised learning operations operate without requiring expert annotation of the medical images from the second set of training data which exhibit inconsistent or missing labeling and inconsistent or missing expert annotations.

According to another embodiment of method 701-702, performing the domain-adaptive pre-training of the AI model via self-supervised learning operations, includes: applying continual pre-training on a large-scale domain-specific dataset represented within the second set of training data having the plurality of medical images derived from the multiple distinct sources; in which the continual pre-training is performed via self-supervised Masked Image Modeling (MIM) learning by the AI model; and in which the self-supervised Masked Image Modeling (MIM) learning by the AI model mitigates over-fitting in the targeted medical diagnosis task.

According to a particular embodiment, there is a non-transitory computer-readable storage media having instructions stored thereupon that, when executed by a system having at least a processor and a memory therein, the instructions cause the processor to execute instructions for systematically implementing self-supervised domain-adaptive pre-training via a transformer for use with medical image classification, by performing operations including: receiving at the system, a first set of training data which includes photographic images unrelated to a targeted medical diagnosis task; receiving at the system, a second set of training data which includes a plurality of medical images derived from multiple distinct sources, in which the plurality of medical images are configured with multiple inconsistent annotation and classification data; executing instructions via the processor of the system for pre-training an AI model on the first set of training data which includes the photographic images by learning image classification from the photographic images within the first set of training data; executing instructions via the processor of the system for performing domain-adaptive pre-training of the AI model via self-supervised learning operations, in which the AI model previously trained on the first set of training data applies domain-adaptive learning to scale up data utilization of the second set of training data within the AI model's learned image classifications; generating a trained domain-adapted AI model by fine-tuning the AI model against the targeted medical diagnosis task using the second set of training data which includes the plurality of medical images; outputting the trained domain-adapted AI model; and executing the trained domain-adapted AI model to generate a predicted medical diagnosis from an input image which forms no part of the first or second sets of training data.

Benchmarking of Vision Transformers (ViTs):

The recent success of Vision Transformers ("ViTs") challenges the dominance of Convolutional Neural Networks (CNNs) for use with image classification tasks. The self-supervised learning (SSL) ViTs, in particular, produce outstanding results in terms of scalability and transferability for natural images. However, for medical images, there is no broad evaluation to benchmark the efficacy of emergent pre-training ViTs, much the methodologies for implementing such techniques.

In accordance with the disclosed embodiments, the transferability of six (6) SSL ViTs and supervised ViTs were evaluated, both of which were pre-trained on ImageNet. On NIH ChestXray14, the models were fine-tuned and tested on the classification task. A comparison among models in different scales is described below (both small and base) as well as across different architectures (such as Vanilla ViT and hierarchical ViT).

Result 1: A first result shows that regardless of the parameter initialization approach, the hierarchical ViT, specifically the Swin Transformer, achieves much better performance than Vanilla ViTs.

Result 2: A second result shows that an SSL ViT, such as SimMIM with a patch masking-reconstruction proxy task in the Swin Transformer architecture, boosts performance even further.

Result 3: And yet a third result shows that, following ImageNet initialization, continuing SimMIM pre-training on chest x-ray images after ImageNet initialization achieves higher accuracy than ResNet-50 at +1.3% mean AUC.

FIG. 8 depicts Table 6 at element 801 illustrating performance of the disclosed methodology when compared with prior known techniques.

As shown in FIG. 8, the performance of the disclosed methodology results in greater performance on the NIH ChestX-ray14 dataset when compared with other initialization techniques using a variety of models.

Performance on the NIH ChestX-ray14 dataset of ViT/CNN models initialized by random weights, ImageNet weights, and six (6) SSL models pre-trained on ImageNet are presented by Table 6. Some of the SSL methods do not have the pre-trained models available for all architectures, resulting in the blank (e.g., "-") entries.

Figure 9:
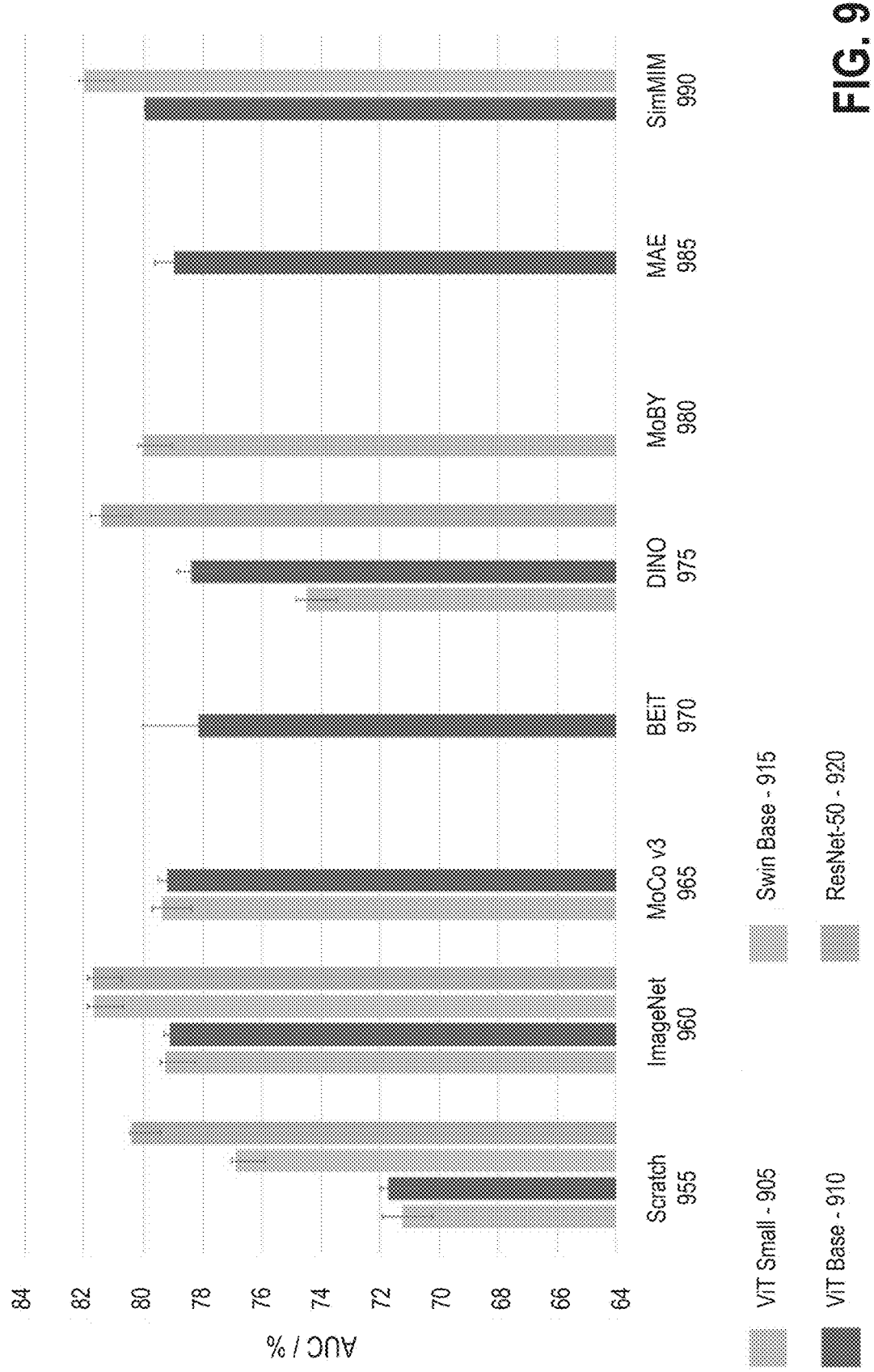
FIG. 9 depicts a chart showing a comparison of classification results on the NIH ChestX-ray14 dataset.

FIG. 9 depicts a chart showing a comparison of classification results (element 995) on the NIH ChestX-ray14 dataset. In particular, there are depicted results for each of various SSL methodologies, including ViT Small at element 905, ViT Base at element 910, Swin Base at element 915, and ResNet-50 at element 920. The results depicted are measured against the AUC percentage (%) on the vertical axis, with the initialization techniques utilized identified on the horizontal axis, including initialization from scratch at element 955, ImageNet at element 960, MoCo v3 at element 965, BEiT at element 970, DINO at element 975, MoBY at element 980, MAE at element 985, and SimMIM at element 990.

As noted above, "Result 1" indicates that the Swin Transformer significantly outperforms the Vanilla ViT whereas "Result 2" indicates that the SimMIM with a patch masking-reconstruction proxy task outperforms other SSL methods.

FIG. 10A depicts Table 7 at element 1001 showing the performance of the disclosed methodology for different pre-training data sets.

So as to evaluate the representation learning ability of the self-supervised ViT models on a massive chest X-ray data set, the evaluations included continued self-supervised training using the nearly 1-million chest X-ray images collected from various datasets.

In particular, the methods 1070 evaluated included DINO+ViT Base at element 1071 and SimMIM+Swin Base at element 1072, each evaluated using pre-training data 1075 including ImageNet-1k (element 1076), AllX-rays (element 1077), and ImageNet-1k+AllX-rays (element 1078).

Figure 10B:
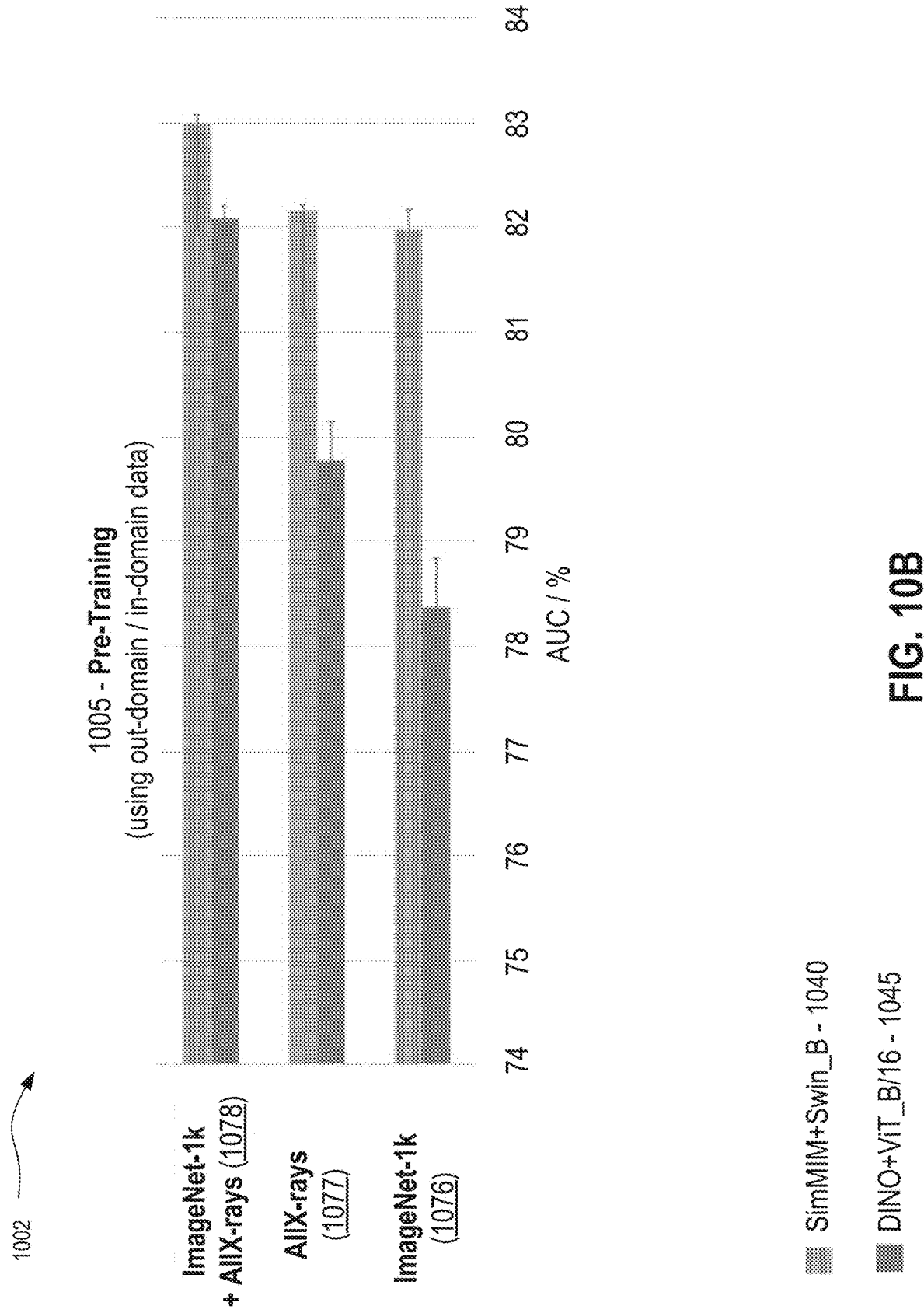
FIG. 10B depicts a chart showing the results of pre-training on out-domain and in-domain data.

FIG. 10B depicts a chart 1002 showing the results of pre-training 1005 on out-domain and in-domain data.

More specifically, SimMIM+Swin_B (element 1040) results in greater performance across each of the combined ImageNet-1k+AllX-rays (element 1078) data sets, as well as for each of the AllX-rays (element 1077) data sets and ImageNet-1k (element 1076) data sets individually.

Consequently, "Result 3" indicates that continuing self-supervised pre-training on in-domain data (+AllX-rays) significantly improves performance in comparison to DINO+ViT_B/16 (element 1045).

Figure 11:
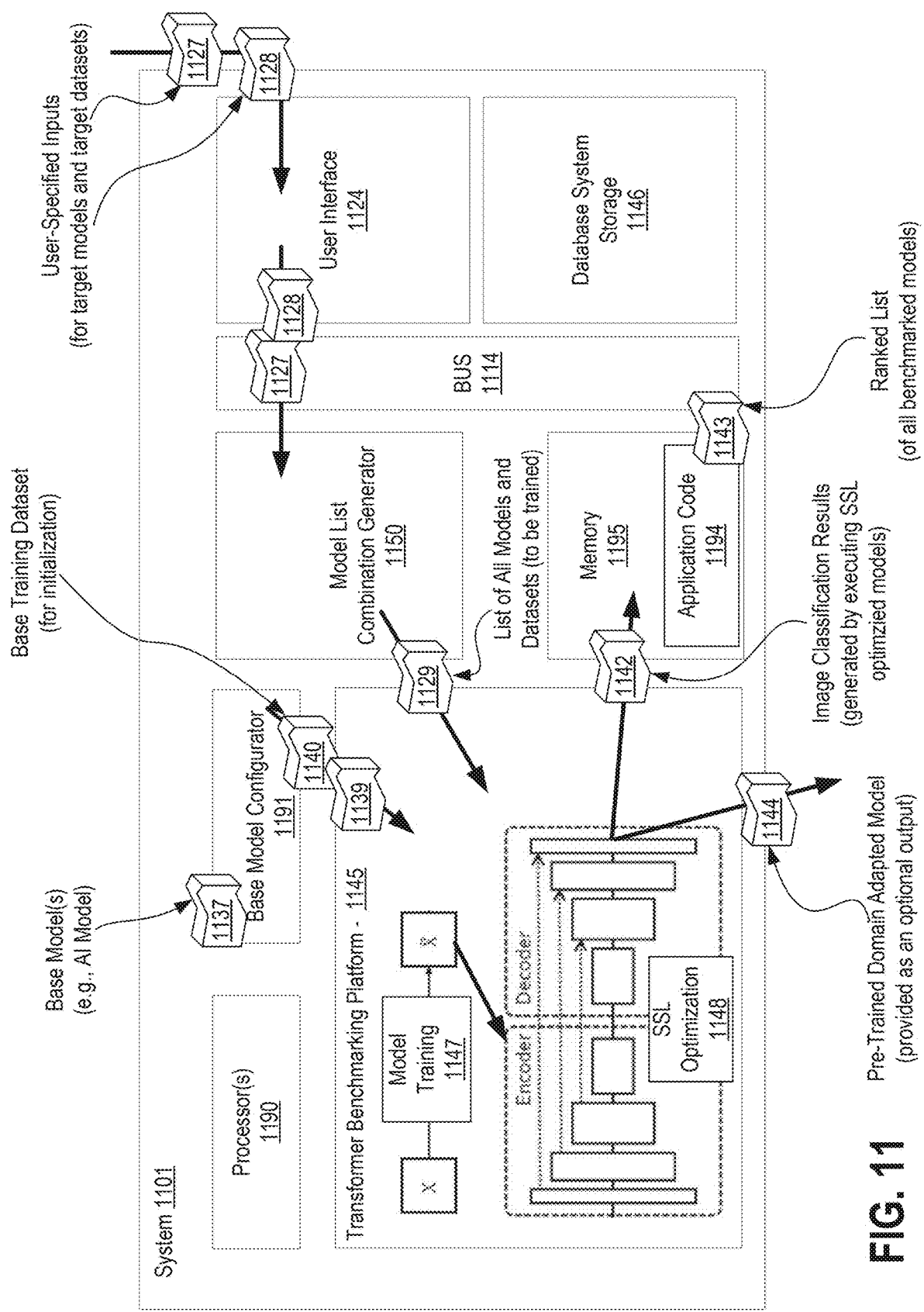
FIG. 11 shows a diagrammatic representation of a system within which embodiments may operate, be installed, integrated, or configured.

FIG. 11 shows a diagrammatic representation of a system 1101 within which embodiments may operate, be installed, integrated, or configured. In accordance with one embodiment, there is a system 1101 having at least a processor 1190 and a memory 1195 therein to execute implementing application code 1194. Such a system 1101 may communicatively interface with and cooperatively execute with the benefit of remote systems, such as a user device sending instructions and data, a user device to receive as an output from the system 1101 a semantics-enriched pre-trained model having a trained encoder-decoder structure with generic feature extraction and refinement operations as performed by the system 1101, or systems within a networked or within a client-server environment, etc.

According to the depicted embodiment, the system 1101, includes the processor 1190 and the memory 1195 to execute instructions at the system 1101. The system 1101 as depicted here is specifically customized and configured to implement the systematic benchmarking of user-specified vision transformers and user-specified datasets for use with chest x-ray classification, in which trained models may then be utilized for the processing of medical imaging.

According to a particular embodiment, system 1101 is specially configured to execute instructions for systematically benchmarking vision transformers for use with chest x-ray classification, by performing operations including: receiving first user input 1127 specifying multiple vision transformers; receiving second user input 1128 specifying multiple training image datasets; generating a list 1129 of all possible combinations of the multiple vision transformers specified (e.g., via the model list combination generator at element 1150) and the multiple training image datasets specified according to the first and second user inputs (elements 1127 and 1128). Such a system 1101 is further configured for retrieving a pre-trained base model 1139 for each of the multiple vision transformers specified (e.g., via the base model configurator 1191) and storing the pre-trained base models 1139 retrieved into the memory 1195 of the system 1101 for local execution. The system further is configured for retrieving the multiple training image datasets 1140 specified and storing the multiple training image datasets locally at the system 1101. The system 1101 is further configured for initializing each of the pre-trained base models 1139 stored in memory 1195 using a standardized dataset 1140, such a ImageNet, with randomized initialization weights (e.g., via the transformer benchmarking platform 1145) to generate initialized vision transformer models corresponding to each of the pre-trained base models stored in memory via model training 1147. The system further executes Self-Supervised Learning (SSL) against each of the previously initialized vision transformer models (e.g., via SSL optimization component 1148) using each of the multiple training image datasets corresponding to the list 1129 of all possible combinations previously generated to produce as output multiple SSL trained vision transformer models corresponding to the list of all possible combinations previously generated. The system further executes, via the processor of the system, each of the multiple SSL trained vision transformer models to generate image classification results 1142 as output from each of the multiple SSL trained vision transformer models; and then outputs from the system, a ranking (e.g., ranked list at element 1143) of the image classification results 1142 generated as the output from each of the multiple SSL trained vision transformer models according to an area under the curve percentage calculation.

Bus 1114 interfaces the various components of the system 1101 amongst each other, with any other peripheral(s) of the system 1101, such as database storage system 1146, and with external components such as external network elements, other machines, client devices, cloud computing services, etc. Communications may further include communicating with external devices via a network interface over a LAN, WAN, or the public Internet.

According to yet another embodiment, the system 1101, having a memory 1195 to store instructions and a processor 1190 to execute the instructions stored in the memory 1195; further is specially configured to execute instructions via the processor for performing the following operations: receiving at the system 1101, a first set of training data 1140 which includes photographic images unrelated to a targeted medical diagnosis task; receiving at the system 1101, a second set of training data 1127 and 1128 (e.g., which may be user-specified) which includes a plurality of medical images derived from multiple distinct sources, wherein the plurality of medical images are configured with multiple inconsistent annotation and classification data. The system executes instructions via the processor 1190 of the system for pre-training (e.g., via model training block 1147) an AI model 1137 on the first set of training data which includes the photographic images by learning image classification from the photographic images within the first set of training data. The system further executes instructions via the processor of the system for performing domain-adaptive pre-training of the AI model via self-supervised learning operations (e.g., via SSL optimization block 1148), wherein the AI model previously trained on the first set of training data applies domain-adaptive learning to scale up data utilization of the second set of training data within the AI model's learned image classifications (e.g., image classification results 1142). The system further generates a trained domain-adapted AI model by fine-tuning the AI model against the targeted medical diagnosis task using the second set of training data which includes the plurality of medical images and outputs the trained domain-adapted AI model (e.g., as one of the benchmarked models). The system then executes the trained domain-adapted AI model 1144 to generate a predicted medical diagnosis from an input image which forms no part of the first or second sets of training data.

Figure 12A:
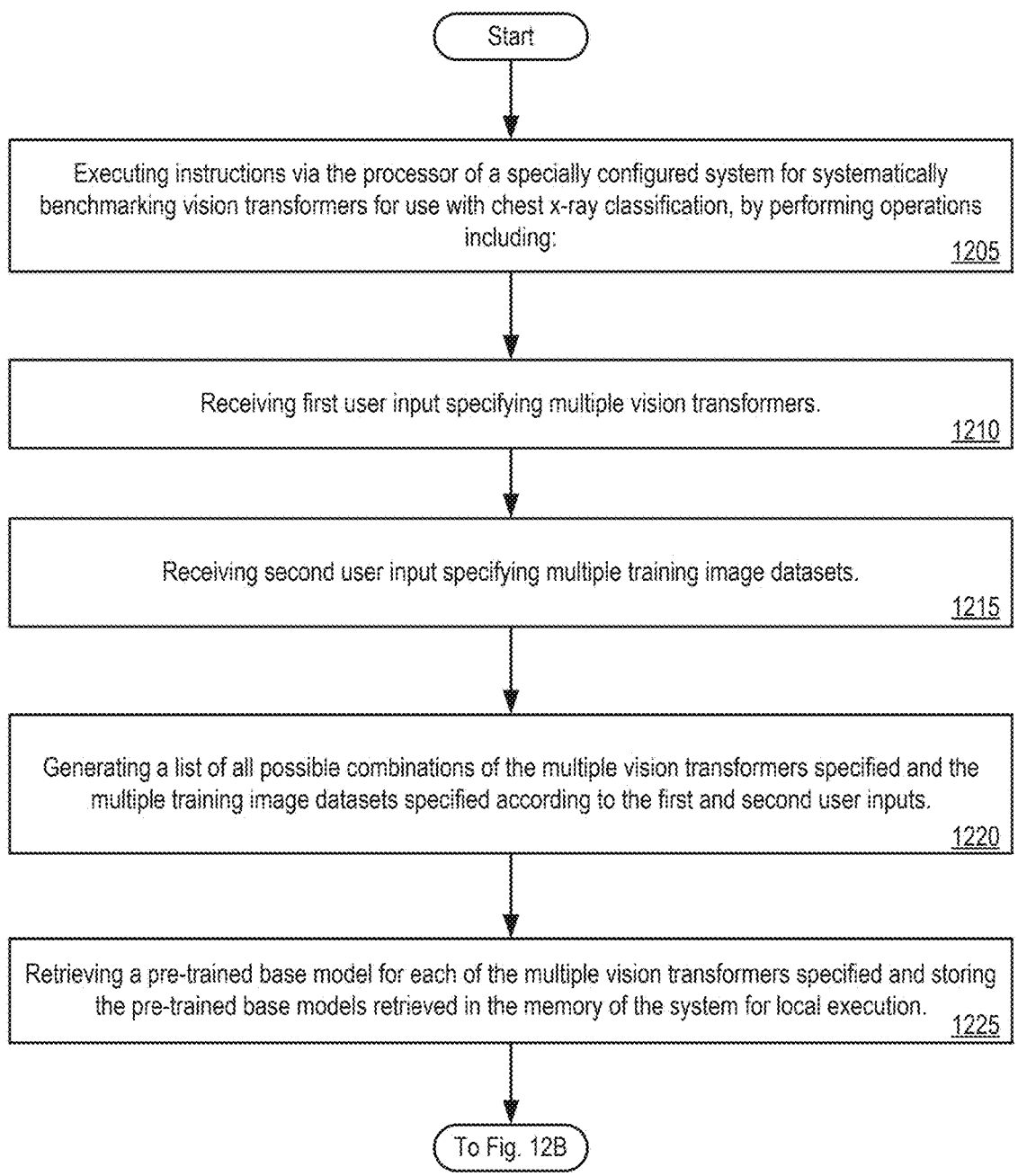
FIGS. 12A and 12B depict a flow diagram illustrating a method for systematically benchmarking vision transformers for use with chest x-ray classification, in accordance with disclosed embodiments.
Figure 12B:
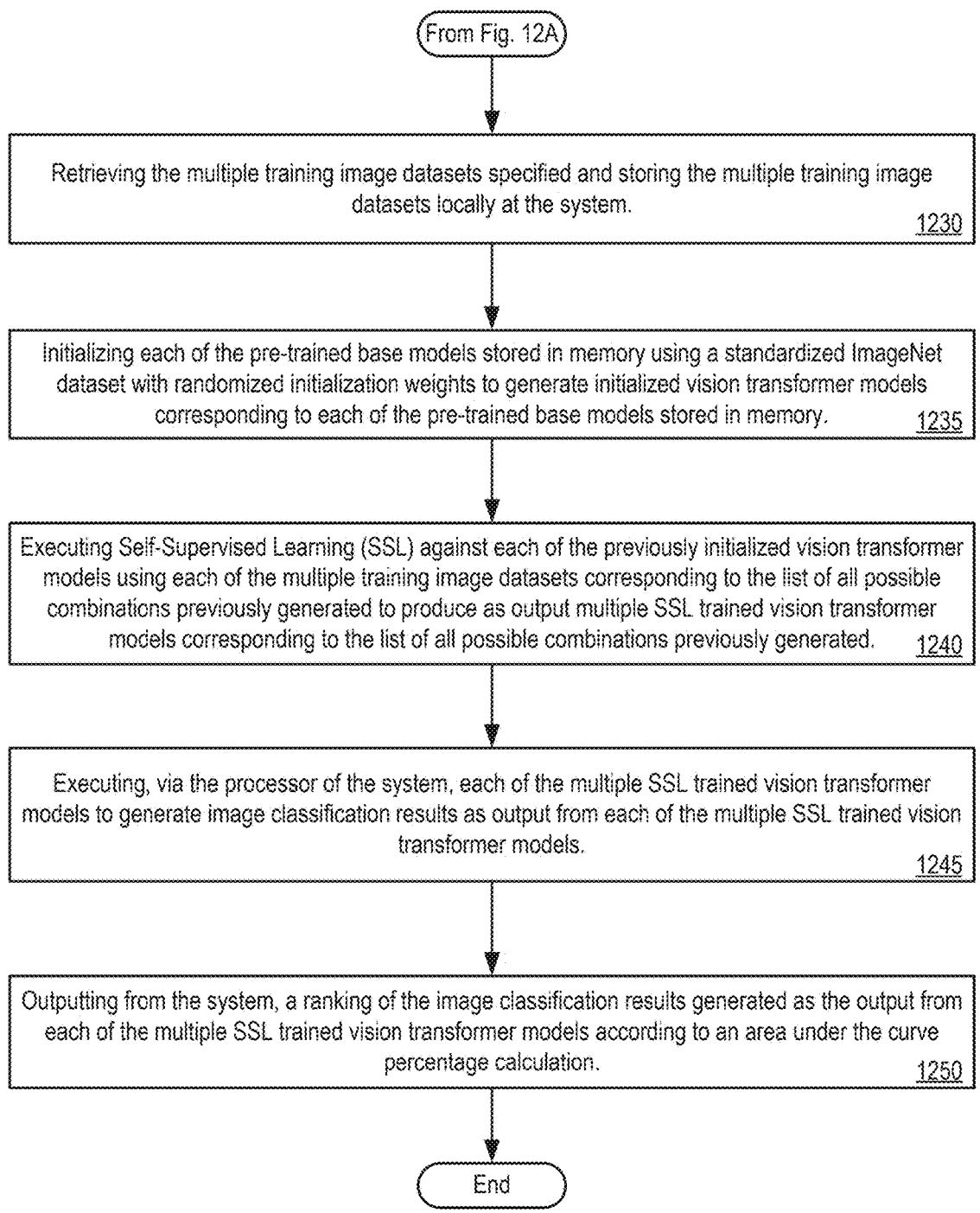

FIGS. 12A and 12B depict a flow diagram illustrating a method 1201-1202 for systematically benchmarking vision transformers for use with chest x-ray classification, in accordance with disclosed embodiments. Method 1201-1202 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the system 1101 (see FIG. 11) and the machine 1301 (see FIG. 13) and the other supporting systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1201-1202 depicted at FIGS. 12A and 12B, starting at block 1205, there is a method performed by executing instructions via the processor of a specially configured system for systematically benchmarking vision transformers for use with chest x-ray classification. Such a system may be configured with at least a processor and a memory to execute specialized instructions which cause the system to perform the following operations:

At block 1210, processing logic receives a first user input specifying multiple vision transformers.

At block 1215, processing logic receives a second user input specifying multiple training image datasets.

At block 1220, processing logic generates a list of all possible combinations of the multiple vision transformers specified and the multiple training image datasets specified according to the first and second user inputs.

At block 1225, processing logic retrieves a pre-trained base model for each of the multiple vision transformers specified and storing the pre-trained base models retrieved in the memory of the system for local execution.

Transitioning from FIG. 12A to the processing which continues at FIG. 12B, the processing of method 1201-1202 resumes at block 1230.

At block 1230, processing logic retrieves the multiple training image datasets specified and storing the multiple training image datasets locally at the system.

At block 1235, processing logic initializes each of the pre-trained base models stored in memory using a standardized ImageNet dataset with randomized initialization weights to generate initialized vision transformer models corresponding to each of the pre-trained base models stored in memory.

At block 1240, processing logic executes Self-Supervised Learning (SSL) against each of the previously initialized vision transformer models using each of the multiple training image datasets corresponding to the list of all possible combinations previously generated to produce as output multiple SSL trained vision transformer models corresponding to the list of all possible combinations previously generated.

At block 1245, processing logic executes, via the processor of the system, each of the multiple SSL trained vision transformer models to generate image classification results as output from each of the multiple SSL trained vision transformer models.

At block 1250, processing logic outputs from the system, a ranking of the image classification results generated as the output from each of the multiple SSL trained vision transformer models according to an area under the curve percentage calculation.

According to another embodiment of method 1201-1202, the system implements a systematic benchmarking platform for user-selectable vision transformers.

According to another embodiment of method 1201-1202, the system performs benchmarking using chest X-ray classification by executing each of the multiple SSL trained vision transformer models and generating the image classification results as the output from each of the multiple SSL trained vision transformer models.

According to another embodiment of method 1201-1202, receiving the second user input specifying the multiple training image datasets includes receiving input specifying one or more datasets including medical images.

According to another embodiment, method 1201-1202 further includes: receiving as third user input, multiple different Self-Supervised Learning (SSL) execution methods.

According to another embodiment of method 1201-1202, executing the Self-Supervised Learning against each of the previously initialized vision transformer models further includes executing the Self-Supervised Learning against each of the multiple different Self-Supervised Learning (SSL) execution methods as specified by the third user input for each of the previously initialized vision transformer models.

According to another embodiment of method 1201-1202, the ranking of the image classification results indicates transferability of each of the multiple SSL trained vision transformer models from processing of natural images to processing of medical images.

According to another embodiment of method 1201-1202, the ranking of the image classification results indicates scalability of each of the multiple SSL trained vision transformer models from processing of natural images to processing of medical images.

According to another embodiment of method 1201-1202, executing the Self-Supervised Learning against each of the previously initialized vision transformer models further includes continuing the Self-Supervised Learning until each respective ones of the previously initialized vision transformer models surpasses an accuracy threshold exceeding that of a standardized pre-trained 50-layer deep convolutional neural network.

According to another embodiment of method 1201-1202, the standardized pre-trained 50-layer deep convolutional neural network includes a pre-trained ResNet-50 AI model accessible to the system over a public Internet network interface.

ResNet-50 is a convolutional neural network that is 50 layers deep. You can load a pre-trained version of the network trained on more than a million images from the ImageNet database. The pre-trained network can classify images into 1000 object categories, such as keyboard, mouse, pencil, and many animals. Notably, however, the pre-trained ResNet-50 AI model, which is accessible to the disclosed platform over a public Internet network interface, was not trained using medical images.

According to another embodiment of method 1201-1202, executing the Self-Supervised Learning against each of the previously initialized vision transformer models further includes executing the Self-Supervised Learning supplemented with a patch masking-reconstruction proxy task as part of training the multiple SSL trained vision transformer models.

According to a particular embodiment, there is a non-transitory computer-readable storage media having instructions stored thereupon that, when executed by a system having at least a processor and a memory therein, the instructions cause the processor to execute instructions for systematically benchmarking vision transformers for use with chest x-ray classification, by performing operations including: receiving first user input specifying multiple vision transformers; receiving second user input specifying multiple training image datasets; generating a list of all possible combinations of the multiple vision transformers specified and the multiple training image datasets specified according to the first and second user inputs; retrieving a pre-trained base model for each of the multiple vision transformers specified and storing the pre-trained base models retrieved in the memory of the system for local execution; retrieving the multiple training image datasets specified and storing the multiple training image datasets locally at the system; initializing each of the pre-trained base models stored in memory using a standardized ImageNet dataset with randomized initialization weights to generate initialized vision transformer models corresponding to each of the pre-trained base models stored in memory; executing Self-Supervised Learning (SSL) against each of the previously initialized vision transformer models using each of the multiple training image datasets corresponding to the list of all possible combinations previously generated to produce as output multiple SSL trained vision transformer models corresponding to the list of all possible combinations previously generated; executing, via the processor of the system, each of the multiple SSL trained vision transformer models to generate image classification results as output from each of the multiple SSL trained vision transformer models; and outputting from the system, a ranking of the image classification results generated as the output from each of the multiple SSL trained vision transformer models according to an area under the curve percentage calculation.

FIG. 13 illustrates a diagrammatic representation of a machine 1301 in the exemplary form of a computer system, in accordance with one embodiment, within which a set of instructions, for causing the machine/computer system to perform any one or more of the methodologies discussed herein, may be executed.

In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify and mandate the specifically configured actions to be taken by that machine pursuant to stored instructions. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary machine 1301 includes a processor 1302, a main memory 1304 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1316 (e.g., a persistent storage device including hard disk drives and a persistent database and/or a multi-tenant database implementation), which communicate with each other via a bus 1330. Main memory 1304 includes instructions for executing the various benchmarking techniques of the transformer benchmarking platform 1369 as described herein, including the execution components configured for receiving input specifying target models 1324, the receiving input specifying target datasets 1323, and execution components configured for retrieving a base model and base training (non-specified) data set which is utilized for model initialization. Further depicted are the SSL learning optimization instructions 1325 which are applied to previously initialized models, in support of the methodologies and techniques described herein. Main memory 1304 and its sub-elements are further operable in conjunction with processing logic 1326 and processor 1302 to perform the methodologies discussed herein.

Processor 1302 represents one or more specialized and specifically configured processing devices such as a microprocessor, central processing unit, or the like. More particularly, the processor 1302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1302 may also be one or more special-purpose processing devices such as an application-specific integrated circuit (ASIC), a field programmable gate array (FPGA), a digital signal processor (DSP), network processor, or the like. Processor 1302 is configured to execute the processing logic 1326 for performing the operations and functionality which is discussed herein.

The machine 1301 may further include a network interface card 1306. The machine 1301 also may include a user interface 1310 (such as a video display unit, a liquid crystal display, etc.), an alphanumeric input device 1312 (e.g., a keyboard), a cursor control device 1313 (e.g., a mouse), and a signal generation device 1351 (e.g., an integrated speaker). The machine 1301 or computer system may further include peripheral device 1336 (e.g., wireless or wired communication devices, memory devices, storage devices, audio processing devices, video processing devices, etc.).

The secondary memory 1316 may include a non-transitory machine-readable storage medium or a non-transitory computer readable storage medium or a non-transitory machine-accessible storage medium 1331 on which is stored one or more sets of instructions (e.g., software 1322) embodying any one or more of the methodologies or functions described herein. The software 1322 may also reside, completely or at least partially, within the main memory 1304 and/or within the processor 1302 during execution thereof by the machine 1301, the main memory 1304 and the processor 1302 also constituting machine-readable storage media. The software 1322 may further be transmitted or received over a network 1320 via the network interface card 1306.

Recitation of the Numbered Embodiments

In accordance with the disclosed embodiments, there is:

1. A system comprising: a memory to store instructions; a processor to execute the instructions stored in the memory; wherein the system is specially configured to execute instructions for systematically benchmarking vision transformers for use with chest x-ray classification, by performing operations including: receiving first user input specifying multiple vision transformers; receiving second user input specifying multiple training image datasets; generating a list of all possible combinations of the multiple vision transformers specified and the multiple training image datasets specified according to the first and second user inputs; retrieving a pre-trained base model for each of the multiple vision transformers specified and storing the pre-trained base models retrieved in the memory of the system for local execution; retrieving the multiple training image datasets specified and storing the multiple training image datasets locally at the system; initializing each of the pre-trained base models stored in memory using a standardized ImageNet dataset with randomized initialization weights to generate initialized vision transformer models corresponding to each of the pre-trained base models stored in memory; executing Self-Supervised Learning (SSL) against each of the previously initialized vision transformer models using each of the multiple training image datasets corresponding to the list of all possible combinations previously generated to produce as output multiple SSL trained vision transformer models corresponding to the list of all possible combinations previously generated; executing, via the processor of the system, each of the multiple SSL trained vision transformer models to generate image classification results as output from each of the multiple SSL trained vision transformer models; and outputting from the system, a ranking of the image classification results generated as the output from each of the multiple SSL trained vision transformer models according to an area under the curve percentage calculation.

According to another embodiment of the system: wherein the system implements a systematic benchmarking platform for user-selectable vision transformers. According to another embodiment of the system: wherein the system performs benchmarking using chest X-ray classification by executing each of the multiple SSL trained vision transformer models and generating the image classification results as the output from each of the multiple SSL trained vision transformer models. According to another embodiment of the system: wherein receiving the second user input specifying the multiple training image datasets comprises receiving input specifying one or more datasets including medical images. According to another embodiment of the system: operations further include: receiving as third user input, multiple different Self-Supervised Learning (SSL) execution methods; and wherein executing the Self-Supervised Learning against each of the previously initialized vision transformer models further comprises executing the Self-Supervised Learning against each of the multiple different Self-Supervised Learning (SSL) execution methods as specified by the third user input for each of the previously initialized vision transformer models. According to another embodiment of the system: wherein the ranking of the image classification results indicates transferability of each of the multiple SSL trained vision transformer models from processing of natural images to processing of medical images. According to another embodiment of the system: wherein the ranking of the image classification results indicates scalability of each of the multiple SSL trained vision transformer models from processing of natural images to processing of medical images. According to another embodiment of the system: wherein executing the Self-Supervised Learning against each of the previously initialized vision transformer models further comprises continuing the Self-Supervised Learning until each respective ones of the previously initialized vision transformer models surpasses an accuracy threshold exceeding that of a standardized pre-trained 50-layer deep convolutional neural network. According to another embodiment of the system: wherein the standardized pre-trained 50-layer deep convolutional neural network comprises a pre-trained ResNet-50 AI model accessible to the system over a public Internet network interface. According to another embodiment of the system: wherein executing the Self-Supervised Learning against each of the previously initialized vision transformer models further comprises executing the Self-Supervised Learning supplemented with a patch masking-reconstruction proxy task as part of training the multiple SSL trained vision transformer models.

2. According to yet another embodiment, there is a method performed by a system having at least a processor and a memory therein to execute instructions for systematically benchmarking vision transformers for use with chest x-ray classification, wherein the method comprises: receiving first user input specifying multiple vision transformers; receiving second user input specifying multiple training image datasets; generating a list of all possible combinations of the multiple vision transformers specified and the multiple training image datasets specified according to the first and second user inputs; retrieving a pre-trained base model for each of the multiple vision transformers specified and storing the pre-trained base models retrieved in the memory of the system for local execution; retrieving the multiple training image datasets specified and storing the multiple training image datasets locally at the system; initializing each of the pre-trained base models stored in memory using a standardized ImageNet dataset with randomized initialization weights to generate initialized vision transformer models corresponding to each of the pre-trained base models stored in memory; executing Self-Supervised Learning (SSL) against each of the previously initialized vision transformer models using each of the multiple training image datasets corresponding to the list of all possible combinations previously generated to produce as output multiple SSL trained vision transformer models corresponding to the list of all possible combinations previously generated; executing, via the processor of the system, each of the multiple SSL trained vision transformer models to generate image classification results as output from each of the multiple SSL trained vision transformer models; and outputting from the system, a ranking of the image classification results generated as the output from each of the multiple SSL trained vision transformer models according to an area under the curve percentage calculation.

3. According to yet another embodiment, there is a non-transitory computer readable storage media having instructions stored thereupon that, when executed by a system having at least a processor and a memory therein, the instructions cause the processor to execute instructions for systematically benchmarking vision transformers for use with chest x-ray classification, by performing operations including: receiving first user input specifying multiple vision transformers; receiving second user input specifying multiple training image datasets; generating a list of all possible combinations of the multiple vision transformers specified and the multiple training image datasets specified according to the first and second user inputs; retrieving a pre-trained base model for each of the multiple vision transformers specified and storing the pre-trained base models retrieved in the memory of the system for local execution; retrieving the multiple training image datasets specified and storing the multiple training image datasets locally at the system; initializing each of the pre-trained base models stored in memory using a standardized ImageNet dataset with randomized initialization weights to generate initialized vision transformer models corresponding to each of the pre-trained base models stored in memory; executing Self-Supervised Learning (SSL) against each of the previously initialized vision transformer models using each of the multiple training image datasets corresponding to the list of all possible combinations previously generated to produce as output multiple SSL trained vision transformer models corresponding to the list of all possible combinations previously generated; executing, via the processor of the system, each of the multiple SSL trained vision transformer models to generate image classification results as output from each of the multiple SSL trained vision transformer models; and outputting from the system, a ranking of the image classification results generated as the output from each of the multiple SSL trained vision transformer models according to an area under the curve percentage calculation.

4. According to yet another embodiment, there is a system comprising: a memory to store instructions; a processor to execute the instructions stored in the memory; wherein the system is specially configured to execute instructions via the processor for performing the following operations: receiving at the system, a first set of training data which includes photographic images unrelated to a targeted medical diagnosis task; receiving at the system, a second set of training data which includes a plurality of medical images derived from multiple distinct sources, wherein the plurality of medical images are configured with multiple inconsistent annotation and classification data; executing instructions via the processor of the system for pre-training an AI model on the first set of training data which includes the photographic images by learning image classification from the photographic images within the first set of training data; executing instructions via the processor of the system for performing domain-adaptive pre-training of the AI model via self-supervised learning operations, wherein the AI model previously trained on the first set of training data applies domain-adaptive learning to scale up data utilization of the second set of training data within the AI model's learned image classifications; generating a trained domain-adapted AI model by fine-tuning the AI model against the targeted medical diagnosis task using the second set of training data which includes the plurality of medical images; outputting the trained domain-adapted AI model; and executing the trained domain-adapted AI model to generate a predicted medical diagnosis from an input image which forms no part of the first or second sets of training data.

According to another embodiment of the system: wherein pre-training the AI model on the first set of training data generates a trained AI model; and wherein performing domain-adaptive pre-training of the AI model via self-supervised learning operations generates a trained domain-adapted AI model by fine-tuning the trained AI model against the targeted medical diagnosis task using the second set of training data which includes the plurality of medical images. According to another embodiment of the system, processing further includes: performing in-domain medical transfer learning for via the trained domain-adapted AI model by prioritizing all in-domain medical transfer learnings derived from the second set of training data which includes the plurality of medical images over any out-of-domain learnings derived from the pre-training of the AI model on the first set of training data generates a trained AI model. According to another embodiment of the system: wherein prioritizing all in-domain medical transfer learnings is configured to improve performance of the trained domain-adapted AI model by reducing domain disparities between a source domain corresponding to the first set of training data and a target domain corresponding to the second set of training data which includes the plurality of medical images. According to another embodiment of the system: wherein receiving the first set of training data which includes photographic images unrelated to a targeted medical diagnosis task comprises receiving photographic images corresponding to a first domain type which lacks medical imaging data. According to another embodiment of the system: wherein receiving the second set of training data which includes a plurality of medical images comprises receiving medical imaging data corresponding to a second domain type having at least a sub-set of the plurality of medical images correlated to the targeted medical diagnosis task. According to another embodiment of the system: wherein receiving the first set of training data which includes photographic images unrelated to a targeted medical diagnosis task comprises receiving a set of non-domain specific photographic images lacking any images correlated to the targeted medical diagnosis task. According to another embodiment of the system, processing further includes: receiving, at the system, multiple medical imaging training data sets from multiple distinct sources; aggregating the multiple medical imaging training data sets into a single aggregated medical imaging dataset; and wherein, receiving at the system, the second set of training data which includes the plurality of medical images derived from multiple distinct sources comprises specifying the single aggregated medical imaging dataset as the second set of training data for performing the domain-adaptive pre-training of the AI model. According to another embodiment of the system: wherein receiving the second set of training data which includes the plurality of medical images derived from multiple distinct sources includes training data incompatible with supervised learning for the AI model. According to another embodiment of the system: wherein the plurality of medical images received with the second set of training data are configured with multiple inconsistent annotation and classification data including at least two or more of: inconsistent annotations across a sub-set of the plurality of medical images for the targeted medical diagnosis task; inconsistent annotations across a sub-set of the plurality of medical images for a common disease condition represented within the plurality of medical images; inconsistent annotations across a sub-set of the plurality of medical images for a common human anatomical feature classified within the plurality of medical images; inconsistent global level image annotations identifying disease conditions within an image and local level boxed-lesion labels identifying disease conditions within bounding boxes present within the plurality of medical images; inconsistent use of expert annotations for the plurality of medical images with at least a first portion of the plurality of medical images including expert annotations and at least a second portion of the plurality of medical images lacking any expert annotations; and inconsistent use of radiological reports associated with the plurality of medical images with at least a first portion of the plurality of medical images having radiological reports associated with them and at least a second portion of the plurality of medical images lacking any associated radiological reports. According to another embodiment of the system: wherein performing the domain-adaptive pre-training of the AI model via the self-supervised learning operations, bridges a domain gap between photographic images from the first set of training data representing a first domain and medical images from the second set of training data representing a second domain; wherein the self-supervised learning operations operate without requiring expert annotation of the medical images from the second set of training data which exhibit inconsistent or missing labeling and inconsistent or missing expert annotations. According to another embodiment of the system: wherein performing the domain-adaptive pre-training of the AI model via self-supervised learning operations, comprises: applying continual pre-training on a large-scale domain-specific dataset represented within the second set of training data having the plurality of medical images derived from the multiple distinct sources; wherein the continual pre-training is performed via self-supervised Masked Image Modeling (MIM) learning by the AI model; and wherein the self-supervised Masked Image Modeling (MIM) learning by the AI model mitigates over-fitting in the targeted medical diagnosis task.

5. According to yet another embodiment, there is a computer-implemented method performed by a system having at least a processor and a memory therein for executing instructions, wherein the computer-implemented method comprises: receiving at the system, a first set of training data which includes photographic images unrelated to a targeted medical diagnosis task; receiving at the system, a second set of training data which includes a plurality of medical images derived from multiple distinct sources, wherein the plurality of medical images are configured with multiple inconsistent annotation and classification data; executing instructions via the processor of the system for pre-training an AI model on the first set of training data which includes the photographic images by learning image classification from the photographic images within the first set of training data; executing instructions via the processor of the system for performing domain-adaptive pre-training of the AI model via self-supervised learning operations, wherein the AI model previously trained on the first set of training data applies domain-adaptive learning to scale up data utilization of the second set of training data within the AI model's learned image classifications; generating a trained domain-adapted AI model by fine-tuning the AI model against the targeted medical diagnosis task using the second set of training data which includes the plurality of medical images; outputting the trained domain-adapted AI model; and executing the trained domain-adapted AI model to generate a predicted medical diagnosis from an input image which forms no part of the first or second sets of training data.

6. According to yet another embodiment, there is a non-transitory computer readable storage media having instructions stored thereupon that, when executed by a system having at least a processor and a memory therein, the instructions cause the processor to perform operations including: receiving at the system, a first set of training data which includes photographic images unrelated to a targeted medical diagnosis task; receiving at the system, a second set of training data which includes a plurality of medical images derived from multiple distinct sources, wherein the plurality of medical images are configured with multiple inconsistent annotation and classification data; executing instructions via the processor of the system for pre-training an AI model on the first set of training data which includes the photographic images by learning image classification from the photographic images within the first set of training data; executing instructions via the processor of the system for performing domain-adaptive pre-training of the AI model via self-supervised learning operations, wherein the AI model previously trained on the first set of training data applies domain-adaptive learning to scale up data utilization of the second set of training data within the AI model's learned image classifications; generating a trained domain-adapted AI model by fine-tuning the AI model against the targeted medical diagnosis task using the second set of training data which includes the plurality of medical images; outputting the trained domain-adapted AI model; and executing the trained domain-adapted AI model to generate a predicted medical diagnosis from an input image which forms no part of the first or second sets of training data.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims is to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system comprising:
a memory to store instructions;
a processor to execute the instructions stored in the memory;
wherein the system is specially configured to execute instructions via the processor for performing the following operations:
receiving at the system, a first set of training data which includes photographic images unrelated to a targeted medical diagnosis task;
receiving at the system, a second set of training data which includes a plurality of medical images derived from multiple distinct sources, wherein the plurality of medical images are configured with multiple inconsistent annotation and classification data;
executing instructions via the processor of the system for pre-training an AI model on the first set of training data which includes the photographic images by learning image classification from the photographic images within the first set of training data;
executing instructions via the processor of the system for performing domain-adaptive pre-training of the AI model via self-supervised learning operations, wherein the AI model previously trained on the first set of training data applies domain-adaptive learning to scale up data utilization of the second set of training data within the AI model's learned image classifications;
generating a trained domain-adapted AI model by fine-tuning the AI model against the targeted medical diagnosis task using the second set of training data which includes the plurality of medical images;
outputting the trained domain-adapted AI model; and
executing the trained domain-adapted AI model to generate a predicted medical diagnosis from an input image which forms no part of the first or second sets of training data.

2. The system of claim 1:
wherein pre-training the AI model on the first set of training data generates a trained AI model; and
wherein performing domain-adaptive pre-training of the AI model via self-supervised learning operations generates a trained domain-adapted AI model by fine-tuning the trained AI model against the targeted medical diagnosis task using the second set of training data which includes the plurality of medical images.

3. The system of claim 1, further comprising:
performing in-domain medical transfer learning for via the trained domain-adapted AI model by prioritizing all in-domain medical transfer learnings derived from the second set of training data which includes the plurality of medical images over any out-of-domain learnings derived from the pre-training of the AI model on the first set of training data generates a trained AI model.

4. The system of claim 3, wherein prioritizing all in-domain medical transfer learnings is configured to improve performance of the trained domain-adapted AI model by reducing domain disparities between a source domain corresponding to the first set of training data and a target domain corresponding to the second set of training data which includes the plurality of medical images.

5. The system of claim 1, wherein receiving the first set of training data which includes photographic images unrelated to a targeted medical diagnosis task comprises receiving photographic images corresponding to a first domain type which lacks medical imaging data.

6. The system of claim 1, wherein receiving the second set of training data which includes a plurality of medical images comprises receiving medical imaging data corresponding to a second domain type having at least a sub-set of the plurality of medical images correlated to the targeted medical diagnosis task.

7. The system of claim 1, wherein receiving the first set of training data which includes photographic images unrelated to a targeted medical diagnosis task comprises receiving a set of non-domain specific photographic images lacking any images correlated to the targeted medical diagnosis task.

8. The system of claim 1, further comprising:
receiving, at the system, multiple medical imaging training data sets from multiple distinct sources;
aggregating the multiple medical imaging training data sets into a single aggregated medical imaging dataset; and
wherein, receiving at the system, the second set of training data which includes the plurality of medical images derived from multiple distinct sources comprises specifying the single aggregated medical imaging dataset as the second set of training data for performing the domain-adaptive pre-training of the AI model.

9. The system of claim 1, wherein receiving the second set of training data which includes the plurality of medical images derived from multiple distinct sources includes training data incompatible with supervised learning for the AI model.

10. The system of claim 1, wherein the plurality of medical images received with the second set of training data are configured with multiple inconsistent annotation and classification data including at least two or more of:
inconsistent annotations across a sub-set of the plurality of medical images for the targeted medical diagnosis task;
inconsistent annotations across a sub-set of the plurality of medical images for a common disease condition represented within the plurality of medical images;
inconsistent annotations across a sub-set of the plurality of medical images for a common human anatomical feature classified within the plurality of medical images;
inconsistent global level image annotations identifying disease conditions within an image and local level boxed-lesion labels identifying disease conditions within bounding boxes present within the plurality of medical images;
inconsistent use of expert annotations for the plurality of medical images with at least a first portion of the plurality of medical images including expert annotations and at least a second portion of the plurality of medical images lacking any expert annotations; and
inconsistent use of radiological reports associated with the plurality of medical images with at least a first portion of the plurality of medical images having radiological reports associated with them and at least a second portion of the plurality of medical images lacking any associated radiological reports.

11. The system of claim 1, wherein performing the domain-adaptive pre-training of the AI model via the self-supervised learning operations,
bridges a domain gap between photographic images from the first set of training data representing a first domain and medical images from the second set of training data representing a second domain;
wherein the self-supervised learning operations operate without requiring expert annotation of the medical images from the second set of training data which exhibit inconsistent or missing labeling and inconsistent or missing expert annotations.

12. The system of claim 1, wherein performing the domain-adaptive pre-training of the AI model via self-supervised learning operations, comprises:
applying continual pre-training on a large-scale domain-specific dataset represented within the second set of training data having the plurality of medical images derived from the multiple distinct sources;
wherein the continual pre-training is performed via self-supervised Masked Image Modeling (MIM) learning by the AI model; and
wherein the self-supervised Masked Image Modeling (MIM) learning by the AI model mitigates over-fitting in the targeted medical diagnosis task.

13. A computer-implemented method performed by a system having at least a processor and a memory therein for executing instructions, wherein the computer-implemented method comprises:
receiving at the system, a first set of training data which includes photographic images unrelated to a targeted medical diagnosis task;
receiving at the system, a second set of training data which includes a plurality of medical images derived from multiple distinct sources, wherein the plurality of medical images are configured with multiple inconsistent annotation and classification data;
executing instructions via the processor of the system for pre-training an AI model on the first set of training data which includes the photographic images by learning image classification from the photographic images within the first set of training data;
executing instructions via the processor of the system for performing domain-adaptive pre-training of the AI model via self-supervised learning operations, wherein the AI model previously trained on the first set of training data applies domain-adaptive learning to scale up data utilization of the second set of training data within the AI model's learned image classifications;
generating a trained domain-adapted AI model by fine-tuning the AI model against the targeted medical diagnosis task using the second set of training data which includes the plurality of medical images;
outputting the trained domain-adapted AI model; and
executing the trained domain-adapted AI model to generate a predicted medical diagnosis from an input image which forms no part of the first or second sets of training data.

14. The computer-implemented method of claim 13:
wherein pre-training the AI model on the first set of training data generates a trained AI model; and
wherein performing domain-adaptive pre-training of the AI model via self-supervised learning operations generates a trained domain-adapted AI model by fine-tuning the trained AI model against the targeted medical diagnosis task using the second set of training data which includes the plurality of medical images.

15. The computer-implemented method of claim 13, further comprising:
performing in-domain medical transfer learning for via the trained domain-adapted AI model by prioritizing all in-domain medical transfer learnings derived from the second set of training data which includes the plurality of medical images over any out-of-domain learnings derived from the pre-training of the AI model on the first set of training data generates a trained AI model; and
wherein prioritizing all in-domain medical transfer learnings is configured to improve performance of the trained domain-adapted AI model by reducing domain disparities between a source domain corresponding to the first set of training data and a target domain corresponding to the second set of training data which includes the plurality of medical images.

16. The computer-implemented method of claim 13, wherein receiving the first set of training data which includes photographic images unrelated to a targeted medical diagnosis task comprises receiving photographic images corresponding to a first domain type which lacks medical imaging data; and wherein receiving the second set of training data which includes a plurality of medical images comprises receiving medical imaging data corresponding to a second domain type having at least a sub-set of the plurality of medical images correlated to the targeted medical diagnosis task.

17. The computer-implemented method of claim 13, wherein receiving the first set of training data which includes photographic images unrelated to a targeted medical diagnosis task comprises receiving a set of non-domain specific photographic images lacking any images correlated to the targeted medical diagnosis task.

18. The computer-implemented method of claim 13, further comprising:

receiving, at the system, multiple medical imaging training data sets from multiple distinct sources;

aggregating the multiple medical imaging training data sets into a single aggregated medical imaging dataset; and wherein, receiving at the system, the second set of training data which includes the plurality of medical images derived from multiple distinct sources comprises specifying the single aggregated medical imaging dataset as the second set of training data for performing the domain-adaptive pre-training of the AI model.

19. The computer-implemented method of claim 13, wherein the plurality of medical images received with the second set of training data are configured with multiple inconsistent annotation and classification data including at least two or more of:

inconsistent annotations across a sub-set of the plurality of medical images for the targeted medical diagnosis task;

inconsistent annotations across a sub-set of the plurality of medical images for a common disease condition represented within the plurality of medical images;

inconsistent annotations across a sub-set of the plurality of medical images for a common human anatomical feature classified within the plurality of medical images;

inconsistent global level image annotations identifying disease conditions within an image and local level boxed-lesion labels identifying disease conditions within bounding boxes present within the plurality of medical images;

inconsistent use of expert annotations for the plurality of medical images with at least a first portion of the plurality of medical images including expert annotations and at least a second portion of the plurality of medical images lacking any expert annotations; and inconsistent use of radiological reports associated with the plurality of medical images with at least a first portion of the plurality of medical images having radiological reports associated with them and at least a second portion of the plurality of medical images lacking any associated radiological reports.

20. A system comprising:

a memory to store instructions;

a processor to execute the instructions stored in the memory;

wherein the system is specially configured to execute instructions for systematically benchmarking vision transformers for use with chest x-ray classification, by performing operations including:

receiving first user input specifying multiple vision transformers;

receiving second user input specifying multiple training image datasets;

generating a list of all possible combinations of the multiple vision transformers specified and the multiple training image datasets specified according to the first and second user inputs;

retrieving a pre-trained base model for each of the multiple vision transformers specified and storing the pre-trained base models retrieved in the memory of the system for local execution;

retrieving the multiple training image datasets specified and storing the multiple training image datasets locally at the system;

initializing each of the pre-trained base models stored in memory using a standardized ImageNet dataset with randomized initialization weights to generate initialized vision transformer models corresponding to each of the pre-trained base models stored in memory;

executing Self-Supervised Learning (SSL) against each of the previously initialized vision transformer models using each of the multiple training image datasets corresponding to the list of all possible combinations previously generated to produce as output multiple SSL trained vision transformer models corresponding to the list of all possible combinations previously generated;

executing, via the processor of the system, each of the multiple SSL trained vision transformer models to generate image classification results as output from each of the multiple SSL trained vision transformer models; and outputting from the system, a ranking of the image classification results generated as the output from each of the multiple SSL trained vision transformer models according to an area under the curve percentage calculation.

* * * * *